US008185437B2

(12) United States Patent
Altberg et al.

(10) Patent No.: US 8,185,437 B2
(45) Date of Patent: May 22, 2012

(54) SYSTEMS AND METHODS TO PROVIDE COMMUNICATION CONNECTIONS VIA PARTNERS

(75) Inventors: Ebbe Altberg, Mill Valley, CA (US);
Scott Faber, San Francisco, CA (US);
Ron Hirson, San Francisco, CA (US);
Sean Van Der Linden, Berkeley, CA (US); Paul G. Manca, Oakland, CA (US)

(73) Assignee: UTBK, Inc., Dover, DE (US)

( * ) Notice: Subject to any disclaimer, the term of this patent is extended or adjusted under 35 U.S.C. 154(b) by 998 days.

(21) Appl. No.: 12/127,713

(22) Filed: May 27, 2008

(65) Prior Publication Data
US 2009/0018912 A1 Jan. 15, 2009

Related U.S. Application Data

(60) Provisional application No. 60/949,509, filed on Jul. 12, 2007.

(51) Int. Cl.
*G06Q 30/00* (2012.01)
*G05B 19/418* (2006.01)

(52) U.S. Cl. ..................................... 705/14.73; 707/607
(58) Field of Classification Search ........................ None
See application file for complete search history.

(56) References Cited

U.S. PATENT DOCUMENTS

| | | | |
|---|---|---|---|
| 2002/0107730 A1 | 8/2002 | Bernstein | |
| 2003/0086556 A1* | 5/2003 | Welch et al. | 379/265.09 |
| 2003/0220866 A1* | 11/2003 | Pisaris-Henderson et al. | 705/37 |
| 2004/0019605 A1 | 1/2004 | Keown et al. | |
| 2004/0044571 A1* | 3/2004 | Bronnimann et al. | 705/14 |
| 2004/0132436 A1 | 7/2004 | Dupont et al. | |
| 2005/0071239 A1* | 3/2005 | Tormey et al. | 705/26 |
| 2005/0187895 A1* | 8/2005 | Paya et al. | 707/1 |

OTHER PUBLICATIONS

Prodigy, Inc. Signs Long-Term Agreement to Use Accipiter Admanager for Online Advertising. Business Wire. p. 06020352. Jun. 2, 1997.*
NetGravity Announces New Internet Marketing Service for Advertising Agencies. Newswire, p. 9993. Jan. 25, 1999.*

* cited by examiner

*Primary Examiner* — John Weiss
*Assistant Examiner* — Victoria Vanderhorst
(74) *Attorney, Agent, or Firm* — Greenber Traurig, LLP

(57) ABSTRACT

Methods and apparatuses to provide user interfaces dynamically customized according to partners through which the user interfaces are accessed in a customer acquisition process. One embodiment includes providing to a plurality of entities a platform, configured to assign references for embedding in listings for presentation and configured to connect people for real time communications according to the references embedded in the listings, the references to be used to request the platform to provide the connections; responsive to a request received via a first entity of the plurality of entities, presenting a user interface of the platform in a first format to identify the first entity; and responsive to a request received via a second entity of the plurality of entities, presenting the user interface of the platform in a second format to identify the second entity.

20 Claims, 14 Drawing Sheets

141

| Create Ad | [?] Help |

Your ad is very important. Tell customers exactly what you're selling and why they should call you. Please review our Pay Per Call Ad Guidelines to ensure your ad is accepted and gets new customers calling your business today.

Ad Location Info

Business Name: [          ]  (Sorry, no phone numbers)

☐ Use my Account Information

Address 1: [          ]

Address 2: [          ]  (Optional)

City: [          ]

State: [-Select State- ▽]

Zip Code: [   ]–[   ]

Phone Number: ( [   ] ) [   ]–[   ]  Enter the number where you'd like to receive calls Fax: ( [   ] ) [   ]–[   ]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
  - Call today and get $5 off.
  - Free consultation – limited time.
  - Call now and save 10%.
You'll be able to include more information about your offer on the business profile page. Learn more Marketing Message Line 1: [          ]  (35 characters)

Marketing Message Line 2: [          ]  (35 characters)

SYSTEMS AND METHODS TO PROVIDE COMMUNICATION CONNECTIONS VIA PARTNERS

CROSS-REFERENCE TO RELATED APPLICATIONS

The present application claims priority to Provisional U.S. Patent Application Ser. No. 60/949,509, filed Jul. 12, 2007 and entitled "Systems and Methods to Provide Communication Connections via Partners," the disclosure of which is incorporated herein by reference.

The present application is related to U.S. patent application Ser. No. 11/668,881, filed Jan. 30, 2007 and entitled "Systems and Methods to Provide Communication Connections," which claimed priority from Provisional U.S. Patent Application Ser. No. 60/764,719, filed Feb. 1, 2006, and from Provisional U.S. Patent Application Ser. No. 60/799,610, filed May 10, 2006. The disclosures of the parent applications are incorporated herein by reference.

TECHNOLOGY FIELD

At least some embodiments disclosed herein relate to communication connections and advertising in general and, more particularly but not exclusively, to performance-based advertising to provide connections for real time communications, such as connecting people for telephonic conversation, chat in text, voice and/or video, document sharing, screen-sharing, application sharing, etc.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

SUMMARY

Methods and apparatuses to provide user interfaces dynamically customized according to partners through which the user interfaces are accessed in a customer acquisition process are described here. Some embodiments are summarized in this section.

One embodiment includes: providing to a plurality of entities a platform, configured to assign references for embedding in listings for presentation and configured to connect people for real time communications according to the references embedded in the listings, the references to be used to request the platform to provide the connections; responsive to a request received via a first entity of the plurality of entities, presenting a user interface of the platform in a first format to identify the first entity; and responsive to a request received via a second entity of the plurality of entities, presenting the user interface of the platform in a second format to identify the second entity.

One embodiment includes a platform provided to allow a partner to present the listings of a set of sellers under their own label while allowing a connection provider to make the connection, tracking the calls and billing the customers and/or the advertisers on behalf of the sellers. In one embodiment, an interface is provided to allow the partner to use the connection provider to perform the tasks while the user experiences are customized according to one or more attributes of the partner.

In one embodiment, a method includes: responsive to a request from an advertiser via a first partner, providing a user interface customized to identify the first partner to manage a listing of the advertiser; responsive to a request from a customer via a second partner, providing the listing of the advertiser for presentation to the customer via the second partner with a reference associated with the advertiser; and responsive to a request made via the reference for a connection from the customer to the advertiser, providing a user interface customized to identify the second partner to connect the customer to the advertiser.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE DRAWINGS

The present disclosure is illustrated by way of example and not limitation in the figures of the accompanying drawings in which like references indicate similar elements.

FIG. 2 illustrates a user interface for the creation of an advertisement according to one embodiment.

DETAILED DESCRIPTION

Figure 1:
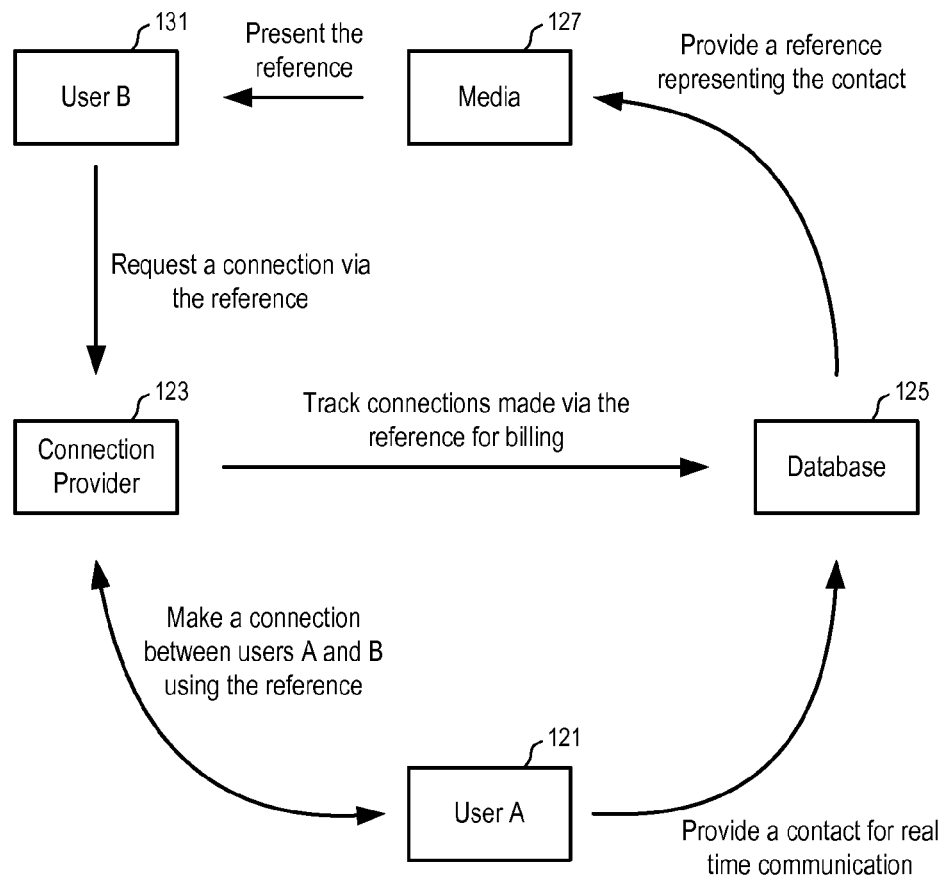
FIG. 1 shows a method to establish connections for real time communications according to one embodiment.

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

In one embodiment, a listing is presented to a user to provide the user with a communication reference, which can be used to request a connection for real time communications between the user and the entity of the listing, such as for telephonic conversations, instant messaging, chat in text, voice and/or video, screen sharing or application sharing, etc. The entity of the listing may be an advertiser who offers an advertisement fee for being presented, or a business entity, a seller, an advisor, an information provider, or a service provider, such as a provider for entertainment, amusement, etc. A listing may include text, graphical presentation, and/or audio or voice.

A listing may or may not be provided on behalf of an advertiser for a fee. For example, a directory service provider may compile listings of some businesses or sellers without the businesses or sellers explicitly request the directory service provider to advertise for them. A business or seller presented by a listing may or may not pay an advertisement fee for the presentation of the listing and/or for the lead to the customers resulting from the presentation of the listing.

For example, a community of users may create listings of businesses, sellers, etc. based on the recommendation of the users. In one embodiment, a listing can be created and edited by the community of users of telephonic apparatuses, such as softphones, cellular phones, or smart phones. The users can provide, edit, and/or modify a description, comments, ratings, etc., about a business or service provider that is identified by a telephonic reference, such as a telephone number of the business or service provider. Alternatively, the listings may have a portion of description that can be edited by the respective advertiser but not by other users. The listing database represents a business directory; and the entities represented by the listings may not pay any fee for being presented. Some of the entities may offer a fee for preferred placement in presentation. In one embodiment, the users may be charged a communication fee for communicating with the entities featured in the listings when the users use the softphones, cellular phones, or smart phones to communicate with the entities.

In one embodiment, an advertiser of an advertisement is charged an advertisement fee based on the performance of the advertisement (e.g., a telephonic connection to a customer, a lead for real time communication with a customer, a deal completed with the customer as a result of the performance, a subscription fee for a number of bundled leads or deals, etc.).

In one embodiment, a listing is provided to allow a customer to be connected to a seller; and the connection provider can charge the customer on behalf of the seller for transactions conducted over the connection provided between the customer and the seller. In one embodiment, the user terminals provided to the customer and the sellers are configured to charge the customer on behalf of the seller for the transactions. The customers and/or the sellers may also be charged for the communication connection. Alternatively, the communication connection may not be charged explicitly; and the communication cost can be covered via the commission fees for charging the customer on behalf of the seller and/or the advertisement fees.

In one embodiment, a presented listing includes a telephonic reference, which is used to identify an "end point" on a telephonic network for a telephonic connection to the "end point". The telephonic network may be a circuit switched network, or a packet switched network, or a combination of one or more circuit switched networks and one or more packet switched networks. For example, the telephonic reference may be a telephone number with an extension, a telephone number without an extension, a session initiation protocol (SIP) uniform resource identifier (URI), a user identifier of an instant messaging network, a user identifier of a Voice over Internet Protocol (VoIP) network, or a user identifier of a peer to peer VoIP network, etc.

In one embodiment, the telephonic references presented in some of the listings are references assigned by a connection server such that, when the references are used, the connection server is in the path of a call for a connection between the caller and the callee. For example, the connection server may be requested to call back the caller and to call the callee separately to connect the caller and the callee according to an assigned reference. For example, the connection server may receive a call, as an end point specified by an assigned reference, and then further connect the call to the callee based on the assigned reference used to receive the call. For example, the connection server may be queried to provide a telephonic reference of the callee according to an assigned reference to allow the caller's device to initiate the call to the callee using the provided reference. For example, the connection server may decrypt or decode an encrypted/encoded phone number of the callee for the caller's device and track the calls made by the caller's device through the decrypting or decoding process.

For example, in one embodiment, when an assigned reference is used to call for connections, the user is connected to a connection server as an end point. The connection server determines the communication reference of the advertiser based on the assigned reference used to connect the user and the connection server and then further connects the user to the advertiser. Through the use of the assigned reference, the connection server is in the path of connecting the user and the advertiser to track the connection made via the advertisement.

For example, the assigned reference can be a telephone number of the connection server, which when called by the user can be used to determine the telephone number of the advertiser; and the telephone number of the advertiser can be used to further connect the call to the advertiser. For example, the assigned reference may be a reference to request a callback to the user to connect to the advertiser. For example, the assigned reference can be an identifier of the advertiser, such as a user ID of the advertiser, a SIP URL of the advertiser, etc.

The assigned reference can be passed to the connection server in a call signaling message of a VoIP call, be used to request a server to resolve the reference into a direct reference for use in a network, or be used to report to a server about the call to the advertiser.

In another embodiment, the telephonic references for some of the listings are designed to be used on telephonic apparatuses which are configured to track the calls made via the telephonic references and/or to report the calls made via the telephonic references. Thus, information about the calls made via the telephonic references can be used at a server to bill advertisers per connections made via the advertisements, to charge the customers on behalf of advisers (or sellers, service providers), to compensate partners based on the call activities, etc.

In a further embodiment, the telephonic references for some of the listings are designed to be used on telephonic apparatuses which are configured to maintain account information, or to communicate with servers of financial institutions to bill advertisers, and/or charge the customers on behalf of advisers, sellers or service providers.

In one embodiment, the user terminals that are designed to make the connections via the advertisement use the assigned reference to track the connections and report to a server the connection made via the advertisement. For example, softphones can be designed to make direct connections over a peer to peer network, without going through a centralized connection server. The softphones can be configured to report the calls made via the advertisements to a server for tracking. Alternatively, the softphones may be configured to deduct fees, or transfer funds, via accounts maintained by the softphones, or accounts accessible individually by the softphones.

In one embodiment, a click to call button includes a reference to the callee, which when selected, causes a telephonic apparatus used by the user, such as a softphone, a cellular phone, or a smart phone, to start a process to call the callee. The reference to the callee may be a SIP address of a connection server encoded with a phone number of the callee, which can be decoded by the connection server to further connect the call to the callee. The reference to the callee may be an encrypted phone number of the callee, which is to be decrypted by a server to allow the telephonic apparatus to call the callee directly (e.g., via a peer to peer network). In one embodiment, the reference can further include parameters such as the search terms used to locate the listings, the time stamp of the search, an electronic coupon/promotion, a bid price for advertisement fee, and/or a price for the service offered by a seller, etc. In one embodiment, the telephonic apparatus is configured to report a call resulted from the advertisement to a server for tracking and/or billing purposes.

In another embodiment, a click to call button is designed to request a connection server to call back to the customer for a connection to the entity of the listing. The click to call button may cause the presentation of an interface to guide the customer through the calling processing and/or to collect a callback reference from the customer (e.g., via a web page). In some embodiments, the callback reference, such as the telephone number of the customer, can be determined automatically from the identity of the customer, or the identity of the device used by the customer. For example, a telephone number of the customer can be looked up from the account of the customer after the customer is authenticated.

In one embodiment, a telephonic apparatus is a softphone implemented at least in part via software, such as an instant messenger, a VoIP client application running on a computer, an applet embedded in a web page, a built-in or plug-in module of a web browser, a handheld device, a personal digital assistant, a cellular phone, a cordless phone, a Bluetooth phone, a WiFi phone, etc. The telephonic apparatus may be designed to make a connection based on Internet Protocol, based on a peer to peer network, based on software, and/or based on a connection to a server or a host computer, etc. In some embodiments, the telephonic apparatus is implemented via hardwire circuitry, such Application-Specific Integrated Circuit (ASIC); in some embodiments, the telephonic apparatus is implemented partially via special purpose hardware circuitry and partially via software, such as Application-Specific Integrated Circuit (ASIC) or Field-Programmable Gate Array (FPGA) with software/firmware; and in some embodiments, the telephonic apparatus is implemented using a set of general purpose hardwire components that are under the control of software.

FIG. 1 shows a method to establish connections for real time communications according to one embodiment. In FIG. 1, user A (121) provides a contact for real time communication, such as a telephone reference of the user A. The contact can be used to establish a connection with user A (121) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (121) is stored in the database (125); and a reference is assigned to represent the contact. Instead of providing the contact to customers, the reference representing the contact is provided through the media (127) to user B (131). Thus, when the user B (131) uses the reference to request a connection with the user A (121), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 1, the user B (131) can use the reference obtained from media (127) to request the connection provider (123) to establish a connection or facilitate a communication channel for real time communications between the user A (121) and the user B (131). The connection provider uses the database (125) to determine the contact of the user A (121) and make a connection between the user A (121) and user B (131) using the contact of the user A (121). Alternatively, the reference may include an encoded/encrypted version of the contact of the user A (121) which can be decoded/decrypted without relying upon the database (125).

In response to the user B's request for a connection, the connection provider (123) may establish two separate connections to the user A (121) and the user B (131) and then bridge the two connections to connect the user A (121) and user B (131). For example, the connection provider (123) may determine the reference from a connection established between the user B (131) and connection provider (123) and then further bridge the connection to the user A (121).

In one embodiment, the connection provider (123) may provide a separate reference to represent the user B (131) and allow the user A (121) to subsequently callback to the user B (131) via the reference that represents the user B (131), if the user A (121) is not currently available for real time communications. The connection provider (123) may schedule an appointment for the user A (121) and user B (131) for a real time communication session. The connection provider (123) may send a notification to the user A (121) to inform the user A (121) about the request for a real time communication.

Alternatively, the user terminal of the user B (131) may provide the encoded/encrypted version of the contact of the user A (121) to the connection provider for a decoded/decrypted version of the contact of the user A (121) just in time when the user terminal of the user B (131) is ready to make a direct connection with a user terminal of the user A (121). For example, the user terminal of the user B (131) can use the decoded/decrypted contact of the user A (121) to make a peer to peer connection with the user terminal of the user A (121) without going through the connection provider (123); and providing the decoded/decrypted contact can be considered a proxy event of a connection between the user terminal of the user B (131) and the user terminal of the user A (121). Alternatively or in combination, the user terminal of the user B (131) and/or the user terminal of the user A (121) can be configured to report to the connection provider the connection between the user terminals. For example, a reporting message may include a call detail record (CDR), indicating the time period of the connection.

In one embodiment, the connection provider (123) tracks the connections made via the reference for billing for the advertisement. For example, the connection provider (123) may charge the advertiser for each communication lead deliver to the user A (121).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

FIG. 2 illustrates a user interface for the creation of an advertisement according to one embodiment. The user interface may be presented via web in a web browser.

In FIG. 2, an interface (141) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (141) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 2, the interface (141) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording are stored in the database for a period of time and deleted if not used after a predetermined period of time, or when the usage of the audio advertisement is lower than a threshold.

Figure 3:
FIG. 3 illustrates a user interface for the creation of a listing according to one embodiment.

FIG. 3 illustrates a user interface for the creation of a listing according to one embodiment. In FIG. 3, an entity can create a listing of service that can be delivered via a real time communication connection, such as a telephonic connection. The interface (143) allows the entity to specify a listing name with tags that can be used to categorize the listings and/or to facilitate searching. For example, the tags of the listing can be used to match with the search criteria of a customer, the content of document in which the listing is to be presented, etc.

In FIG. 3, the interface (143) allows the entity (e.g., an advisor, an entertainer, an information provider, a consultant, etc.) to specify the price of the service offered by the entity. For example, the entity may allow a customer to talk to the entity for free for a period of time specified in the entry box (145), or allow an indefinite period of free communication time. For example, the entity may request the customer to accept a charge after a period of free time, or request the customer to accept a charge before being connected to the entity. For example, the entity may request the customer to accept a per minute price before the customer is being connected to the entity for real time communication. Alternatively, the entity may provide a period of free communication time to the customer for a taste of the service, before requiring a per minute price specified in the interface (143).

In FIG. 3, the entity can also specify a price for a specified period of time, such as $25.00 for 30 minutes and a policy to continue beyond the 30 minutes. For example, the entity may request $25.00 for each additional 30 minutes in a communication session, or request the system to end the call after the initially purchased 30-minute communication session, or no long charge the customer if the customer wishes to continue the conversation beyond the initially purchased 30-minute communication session.

In one embodiment, the entity can specified a set of multiple prices for different purchase options; and the entity can negotiate with a customer during an initially free communication time period to select a price.

Alternatively, the entity may be compensated according to a flat rate specified by the system for services provided to the customers of the system.

Figure 4:
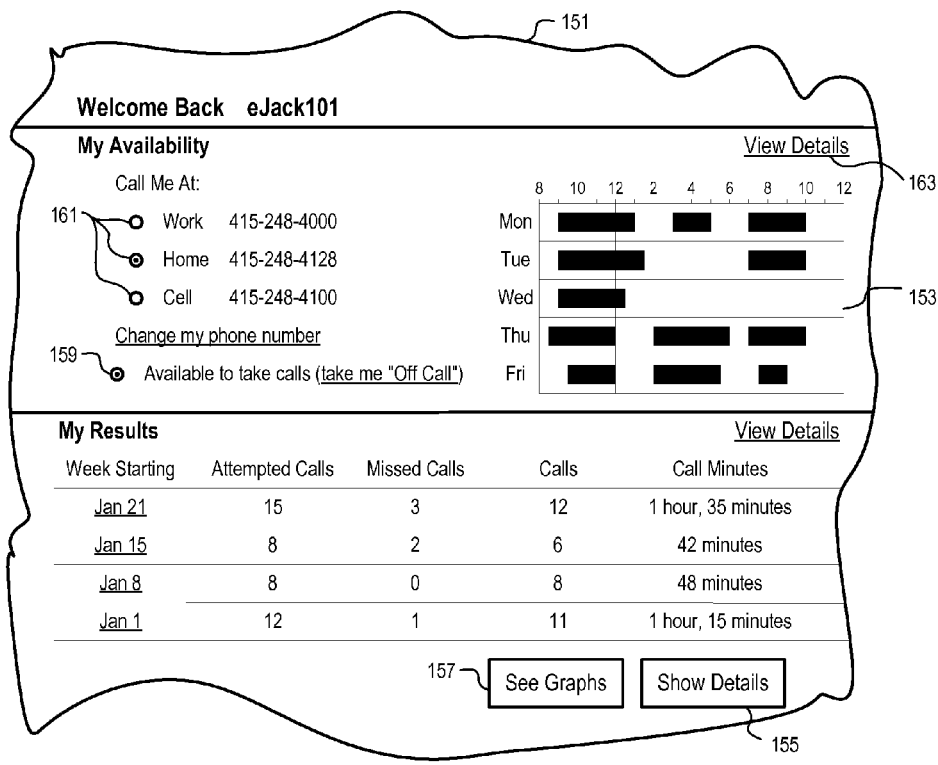
FIG. 4 illustrates an example of a user interface to manage availability for receiving phone calls according to one embodiment.

FIG. 4 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 4, the advertiser/seller may choose a preferred phone number from a set of phone numbers of the seller to receive incoming calls using the option group (161) in the user interface (151). The seller may indicate whether the seller is currently available to take calls or is to be taken "off call" (e.g., using the check box (159)).

In one embodiment, the owner of the listing (e.g., seller, advertiser, advisor, entertainer, consultant, etc.) can request the system to make concurrent calls to the multiple phone numbers. The owner of the listing can use any of the telephonic apparatuses connected at the multiple phone numbers to answer the call.

For example, an advertiser may have multiple telephonic apparatuses at different telephonic references. A connection server can assign a telephonic reference to an advertisement of the advertiser. When a customer calls the connection server at the telephonic reference assigned to the advertisement, the connection server can further connect the call from the customer to the advertiser via multiple concurrent calls to the different telephonic references of the advertiser. Thus, the advertiser can take the call to talk to the customer via any of the multiple telephonic apparatuses of the advertiser.

In one embodiment, during the conversation between the customer and the advertiser, the advertiser may request the connections server to reconnect the call to a different telephonic apparatus. For example, the connection server can place one or more separate concurrent calls to the telephonic references that are currently not in use for the conversation between the customer and the advertiser and then join the separate calls with the existing calls in a conference. This allows the advertiser to switch from one phone to another during the conversation and to bring family, friends, colleagues and/or third parties into the conversation.

In one embodiment, separate concurrent calls can be placed to the telephonic references of the advertiser that are specified prior to the customer's call, such as specified via the user interface (151). Alternatively, the advertiser can request a separate call to a telephonic reference specified in the request during the conversation with the customer. For example, the advertiser may provide the telephonic reference of a third party to invite the third party to join the conversation.

In one embodiment, the system is configured to drop the other concurrent calls when the one of the concurrent calls is answered. Thus, the first answering telephonic apparatus is selected for the connection, although multiple concurrent calls were initially placed.

In one embodiment, when multiple telephonic apparatus of the customer (or the advertiser) are answered substantially at the same time in response to the concurrent calls, one of the answering telephonic apparatus is selected for the connection while the others are disconnected. The selection can be performed based on a set of predefined priorities among the telephonic references, or based on statistics data about past answered calls. For example, the frequencies of the calls being answered on the multiple telephonic references can be used to select the telephonic apparatus that most frequently answered the previous concurrent calls (e.g., previous concurrent calls within the same time window of the day as the current call). For example, the telephonic apparatus that most recently answered the prior concurrent calls can be selected for the current connection request. Alternatively, a random selection from the answering devices can be used to select telephonic apparatus for the current connection request.

In one embodiment, the multiple telephonic references of the advertiser are called for up to a predetermined period of time to allow one or more of the multiple concurrent calls being answered. One or more answered calls can be joined with the call (or calls) with the other party in a conference. This provides a convenient mechanism to set up a conference call among multiple persons between the customer and the advertiser.

Alternatively, the multiple telephone numbers of the advertiser can be called sequentially to connect the advertiser to the customer.

In one embodiment, the system allows the seller to specify the schedule to receive calls; and the schedule (153) is displayed to the seller in a graphical way to help the seller to manage calls. In FIG. 4, the user interface (151) includes a link (163) which can be selected to display a user interface (not shown in FIG. 4) to manage the schedule (153).

In one embodiment, when the schedule or the check button (159) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 4, the user interface (151) also includes a summary of call activities. Buttons (157 and 155) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 5:
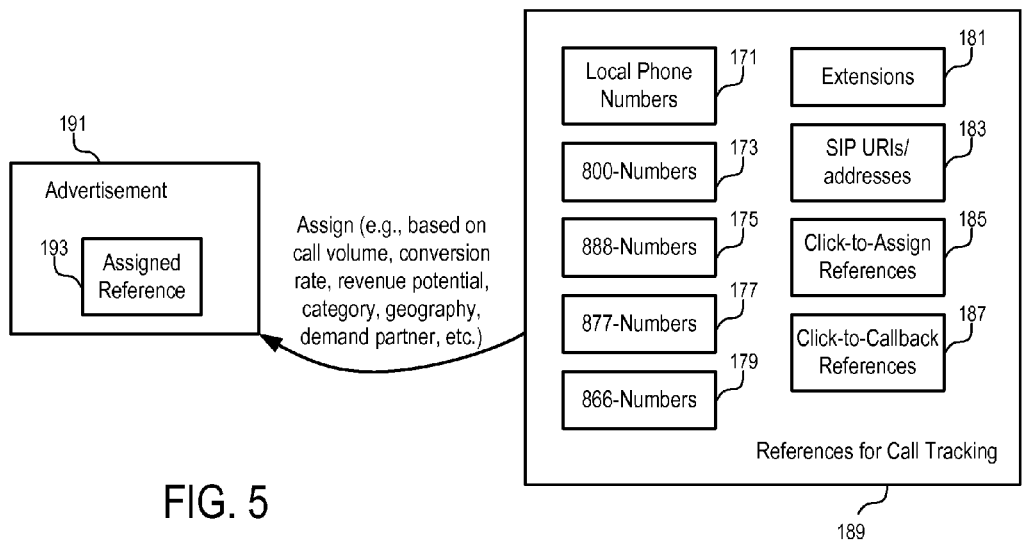
FIG. 5 shows a diagram illustrating a method to select a type of tracking mechanism with a corresponding reference for embedding in an advertisement according to one embodiment.

FIG. 5 shows a diagram illustrating a method to select a type of tracking mechanism with a corresponding reference for embedding in an advertisement according to one embodiment. In FIG. 5, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 5, a pool (189) of different types of references is maintained, such as local phone numbers (171), 800-numbers (173), 888-numbers (175), 877-numbers (177), 866-numbers (179). Some of the references can be dynamically generated and used, such as extensions (181), SIP addresses (183), click-to-assign references (185) and click-to-callback references (187). In one embodiment, one or more of the references are selected and used as the assigned reference (193) that is embedded in the advertisement (191). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 6:
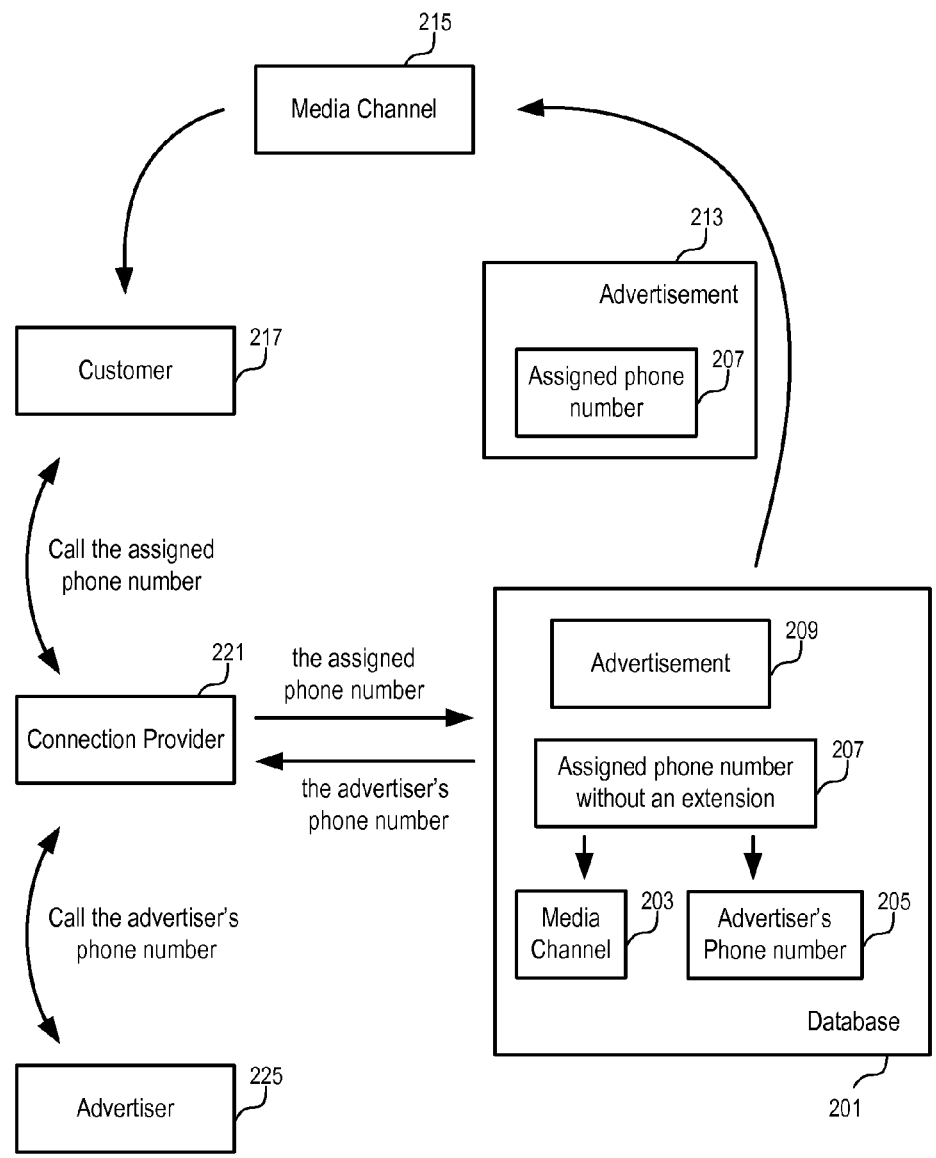
FIG. 6 illustrates an example of telephone call tracking mechanisms which can be selected according to one embodiment.

FIG. 6 illustrates an example of telephone call tracking mechanisms which can be selected according to one embodiment.

In FIG. 6, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 7:
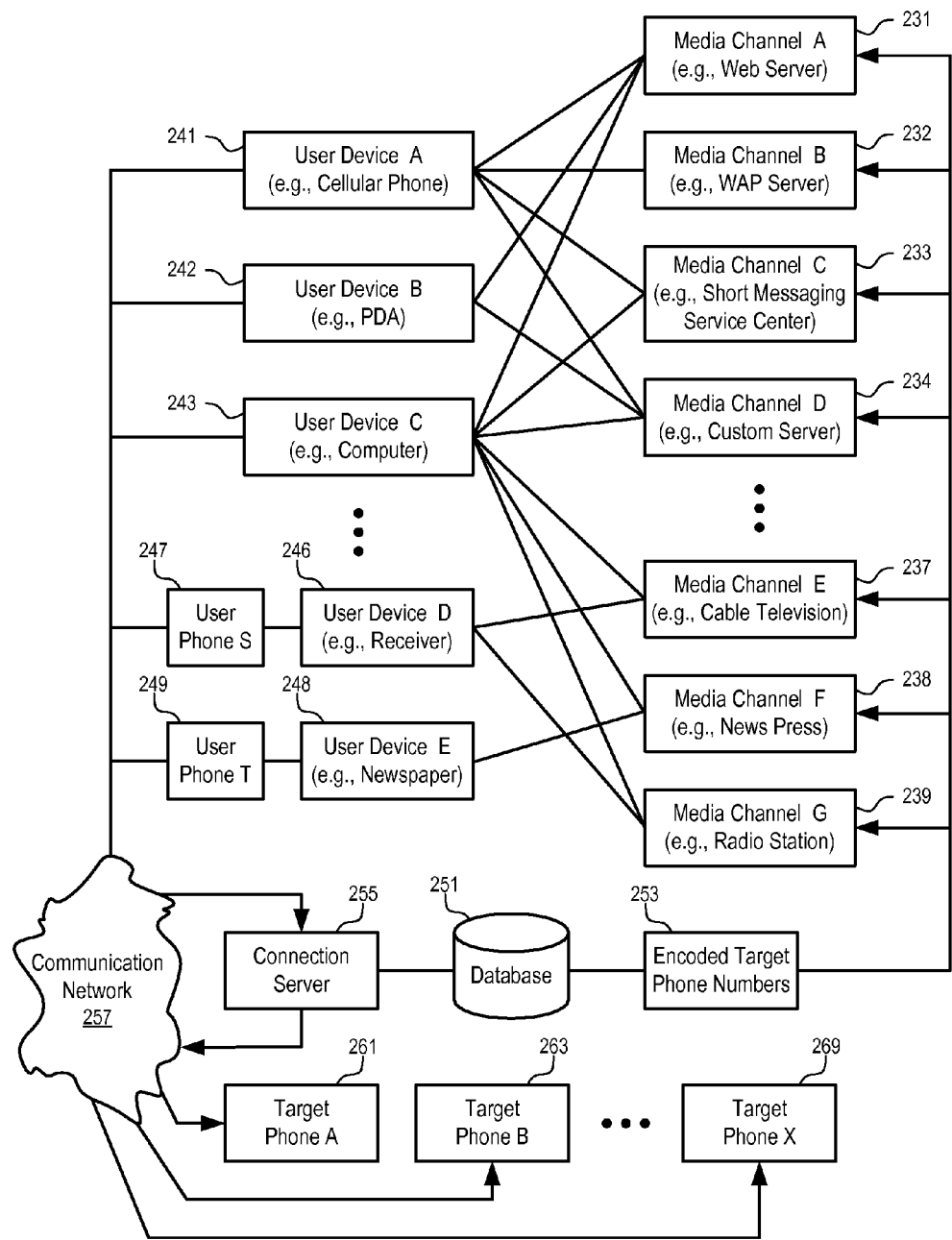
FIG. 7 shows a diagram of a system to make and track phone connections according to one embodiment.

FIG. 7 shows a diagram of a system to make and track phone connections according to one embodiment. In FIG. 7, a database (251) may contain the phone numbers of target phone A (261), target phone B (263), . . . , target phone X (269), etc. Typically, the target phones belong to the institutions, businesses, individuals, etc, which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) and the target phone may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 7, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 8:
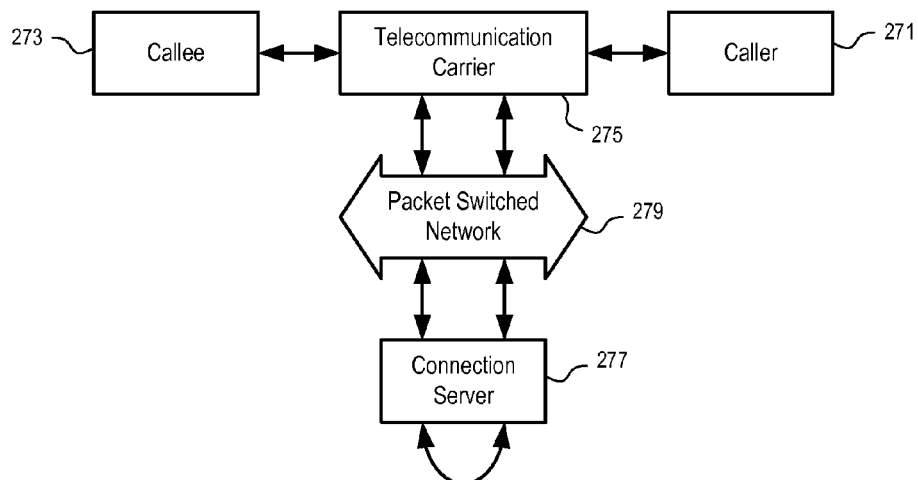
FIG. 8 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 8. In FIG. 8, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection sever (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 8, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 9:
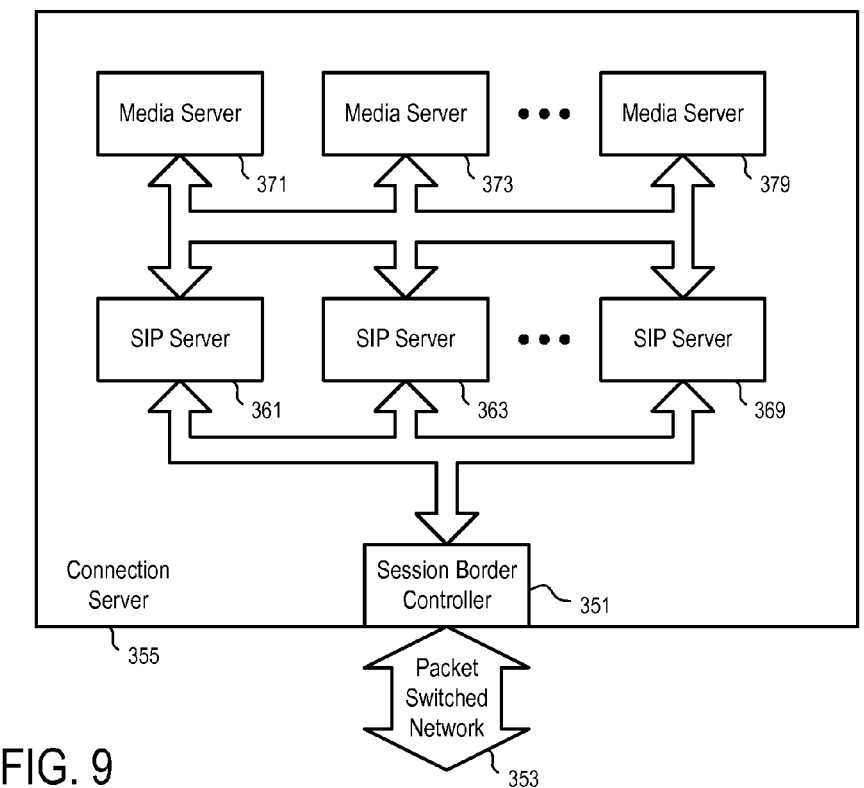
FIG. 9 shows a connection server according to one embodiment.

FIG. 9 shows a connection server according to one embodiment. In FIG. 9, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 9, a set of SIP servers (e.g., 361, 363, . . . , 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (353) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 8 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, . . . , 369) and media servers (371, 373, . . . , 379) are implemented on separate computers connected via a local area network (and/ or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media servers for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figures 10, 11:
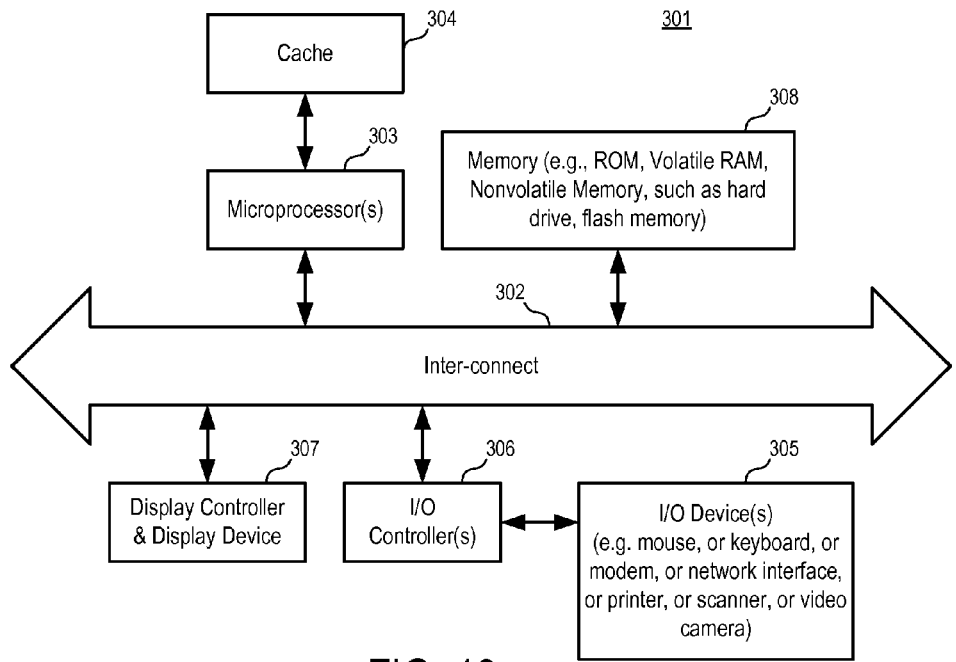
FIG. 10 shows a block diagram example of a data processing system which may be used in various embodiments.
FIG. 11 shows a user interface to arrange a callback to connect a caller to a callee for real time communications according to one embodiment.

FIG. 10 shows a block diagram example of a data processing system which may be used in various embodiments. While FIG. 10 illustrates various components of a computer system, it is not intended to represent any particular architecture or manner of interconnecting the components. Other systems that have fewer or more components may also be used.

In FIG. 10, the communication device (301) is a form of a data processing system. The system (301) includes an inter-connect (302) (e.g., bus and system core logic), which interconnects a microprocessor(s) (303) and memory (308). The microprocessor (303) is coupled to cache memory (304) in the example of FIG. 10.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 10 is used as one of the communication server(s), connection server(s), database server(s), media server(s), controller(s), router(s), gateway(s), etc. In some embodiments, one or more servers of the system can be replaced with the service of a peer to peer network of a plurality of data processing systems, or a network of distributed computing system. The peer to peer network, or a distributed computing system, can be collectively viewed as a server data processing system.

A user terminal as a client system can be a data processing system similar to the system of FIG. 10. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

FIG. 11 shows a user interface to arrange a callback to connect a caller to a callee for real time communications according to one embodiment. For example, when the user selects a click to call reference, the user interface as illustrated in FIG. 11 can be presented.

In FIG. 11, the interface allows the user to specify a time window (321) in which the user is available for real time communications with the callee (e.g., advertiser, advisor, seller, etc.). The user can provide the one or more phone numbers of the user in the entry boxes (e.g., 323, 329). The user can select the control (328) to request further fields for more callback references. In other embodiments, the user can also provide other types of references for a real time communication, such as a member name, a user identifier, an account number, a screen name, a telephonic reference such as a SIP URI, a VoIP user ID, an instant messaging user identifier, etc. In one embodiment, the user can specified a number of callback references of different types, such as phone numbers with or without extension, SIP URIs, instant messaging user identifiers, etc.

In one embodiment, if the user has already signed in, the callback references (e.g., telephone number, user ID, etc.) can be obtained automatically from the user account and filled in the entry boxes (323 and 329) for confirmation by the user. In one embodiment, the user terminal (e.g., a softphone, a cellular phone, etc.) can automatically determine the one or more callback references of the user; and the automatically determined callback reference can be used to pre-fill the entry boxes (323 and 329) for confirmation by the user. Alternatively, when the callback references can be determined via the automated process, the system may initiate the connection process without displaying the interface as illustrated in FIG. 11.

In one embodiment, when the callee is available for real time communications with the user, the connection provider can call the phone number of the user to provide a connection between the user and the callee.

In one embodiment, when the advertiser is available to talk to the customer, the connection server can connect to the customer via multiple concurrent callbacks to the telephonic references of the customer. Thus, the customer can take the callback to talk to the advertiser via any of the multiple telephonic apparatuses of the customer. The system may connect the first answered callback to the advertiser and drop the other callbacks, or allow the customer to pick up more than one callback for a conference call.

In one embodiment, the connection server can initiate multiple concurrent callbacks to the customer and multiple concurrent calls to the advertiser to connect the customer and the advertiser. In one embodiment, the connection server receives a call from the customer and initiates concurrent calls to the advertiser to connect the customer to the advertiser. In one embodiment, the connection server establishes a connection with the advertiser and then initiates multiple concurrent callbacks to the customer to connect the customer to the advertiser.

In one embodiment, multiple concurrent calls are initiated from the user terminal of the customer or from the user terminal of the advertiser. The multiple concurrent calls may include one or more calls for peer to peer connections without going through a connection server.

In one embodiment, multiple calls can be initiated in the user terminal of the customer, or the user terminal of the entity of the listing. For example, when a link or icon button in an advertisement displayed on the softphone (or a mobile phone or smart) of the customer is selected, the softphone can be instructed to initiate multiple concurrent calls to the advertiser based on the multiple references embedded in the link or the icon button. In another example, the advertiser is provided with a message to call back the customer; and the message can include a link or icon button to cause the phone of the advertiser to initiate multiple concurrent callbacks to the customer. In one embodiment, the phone is instructed to make connection with the first answered one of the concurrently placed calls. Alternatively, the phone is instructed to establish a conference for all answered calls.

In one embodiment, a reference to the user request is provided to the advertiser/advisor to allow the advertiser/advisor to initiate the connection with the user for real time communications. For example, the system may send a message to the advertiser/advisor, including the reference to the user, to inform the advertiser/advisor that the user is interested in a callback within the time window specified by the user. The message can be sent via an email, an instant message, an SMS text message, a voice mail, a phone call, etc.

In FIG. 11, the user may further optionally provide a comment in the text field (325) to get the attention of the advertiser/advisor. In one embodiment, the comment provided in the text field (325) is sent to the callee (e.g., advertiser, advisor or seller) with the notification of the request. For example, when the callee is notified via a telephonic connection, the comment can be provided via a text to speech module. For example, when the callee is notified via a visual message, the comment can be included as text.

In FIG. 11, a visual interface is provided to a user to specify a callback number and a time window. Alternatively, the user may call a phone number assigned to the seller to specify the callback numbers and the time window and to record a voice message for the seller. The phone number can be a phone number local to the user, a toll free number (e.g., 1-800-Call-Bob), a telephone number with an extension, a SIP URI, an instant messaging user identifier, a VoIP user identifier, a user identifier of a peer to peer voice communication network, a member name, a click-to-call reference, a reference to a phone number, an Internet address for a voice connection, etc. When the phone number assigned to the seller is called by the user, the call is connected to a connection provider which prompts the user to specify a callback number, a time window, a voice message, if the seller is not immediately available to communicate with the user. In one embodiment, the connection server automatically determines the number of the user (e.g., via an automatic number identification (ANI) service) and ask the user to confirm the use of the number as the callback number. Alternatively, the callback number can be determined from the preference setting of the user, after the user is authenticated over the phone connection.

Figure 12:
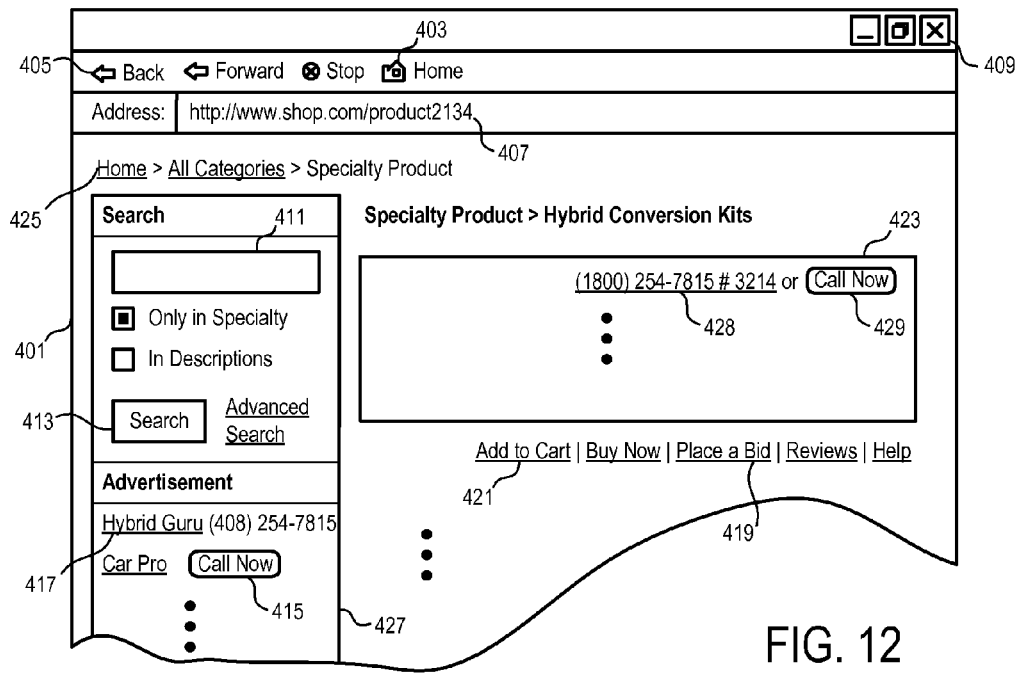
FIG. 12 illustrates an example of presenting information to connect people for real time communications according to one embodiment.

FIG. 12 illustrates the presentation of a document in a web browser (401). The components of the document may include one or more files retrieved by the web browser (401) from one or more servers over a network connection, and/or from a local file system. The servers may be on different domains on the Internet or within the same domain (or web site).

In one embodiment, the document is identified by the address specified in the entry box (407). The file at the location identified by the address may include links to other files at different addresses, which are loaded into the browser as components of the document. Thus, the file retrieved from the address specified in the entry box (407) can be considered as the root file that provides instructions to dynamically assemble the document for presentation in the browser window (401).

The document presented in the web browser (401) can include static content and/or dynamic content. For example, the document can include scripts or applets that dynamically generate content based on interactions with the user. The document may include multimedia streams (e.g., a video or audio stream), a static graphical image, entry fields, and/or selection boxes, etc.

In FIG. 12, the user may select the icon (409) to close the browser window (401) without going to a next document. The user may select one of the navigation buttons (e.g., 405, 403) to go a previously viewed document, with or without refreshing or reloading the previously viewed document. The user may enter a new address in the entry box (407) to visit a new document. The user can enter a search term in the entry box (411) inside the document and select the search button (413) to request a new search result. The user may select a link (417) or an icon button (415) of an advertisement presented in the document to exit the web site. The user may select a link (e.g.,

425, 421, 419) embedded in the current document to load a new document without leaving the web site.

In FIG. 12, the document presented in the browser window (401) represents an e-commerce environment for selling a product (or service). The document may be implemented via a sells widget for presenting a listing of the product (or service) in the area (423) of the browser window (401). In one embodiment, the listing (423) includes an icon button (429) which is selectable to request a call back for a connection with the seller, or to initiate a call (e.g., via a VoIP module embedded in the browser window (401), or via a standalone telephonic module accessible via the browser window (401)).

In FIG. 12, the listing (423) also includes a telephonic reference (428) which can be used to call the connection server using a separate telephonic device for a connection to the seller via the connection server. For example, the customer can dial the telephone number (428) on a telephone separate from the device showing the browser window (401) to initiate a request for a connection to the seller. Although a telephone number of a connection server with an extension for the advertisement is illustrated in FIG. 12 as the explicitly displayed telephonic reference, other types references can also be used, such as a SIP URI, a user identifier of an instant messaging network, a VoIP user identifier, a toll-free number without an extension, a local number with or without extension, etc.

In some embodiments, the icon button (or hyperlink) is provided to allow the user to request the connection to the seller via click to call, without explicitly displaying the telephonic reference (428). In some embodiments, the telephonic reference (428) can be provided without an icon button (or hyperlink) for click to call. In some embodiments, the icon button (or hyperlink) for click to call (or click to dial) can be provided with an explicit presentation of the telephonic reference (428), as illustrated in FIG. 12.

In FIG. 12, the user may select the link (421) to register the product (or service) (e.g., adding the product to an online shopping cart) for a subsequent purchase transaction, or select the link (419) to place a bid in an online auction of the product (or service). For example, the user can select the "Buy Now" link to request a web page to complete a purchase transaction. For example, the user can select the "Reviews" link to request a web page of feedback, comments, recommendations, or suggestions that are provided by prior customers of the product (or service). For example, the user can select the "Help" link to request help information about the sells widget and/or a purchase transaction.

In FIG. 12, the document presented in the browser window (401) includes advertisements (427) that may be relevant to the product (or service) presented in the area (423). For example, the advertisements may include the listings of advisors who offer to provide advice, information, consultation, comments, suggestions relevant to the product (or service) presented in the area (427). The advisors may charge a fee for the service rendered over the communication connection established via the advertisement. In one embodiment, the user may request an initially free connection with the advisor; and after a period of time, the advisor may request payment from the user.

For example, when the user is connected to the advisor via a connection server (e.g., via using the telephonic reference of the connection server assigned temporarily to the advisor to request the connection), the advisor may request the connection server to charge the user on behalf of the advisor to continue the conversation after an initial free period of consultation. In one embodiment, the user may be required to pre-pay the advisor before being connected by the connection server to the advisor for a real time conversation in person.

For example, the user may be connected to the advisor via a peer to peer network, using a softphone, or an instant messaging application, which may be a standalone application or a built-in or plug-in module or an applet of a web browser. When a centralized server is not used in making the connection, the user terminal, such as the softphone or the instant messaging application can be configured to report the transaction to a centralized server for the payment processing, or process the payment via the accounts maintained on the user terminals, or to access accounts via the user terminals to process the payment.

Alternatively or in combination, the advertisements presented in area (427) may include the listings of an advertiser who offers similar products or services as the product (or service) presented in the area (423). Alternatively or in combination, the advertisements may include the listings of an advertiser who offers products or services related to the product (or service) presented in the area (427), in a way that user who are interested in the product (or service) presented in the area (423) are likely interested in these related products or services.

In one embodiment, the advertisements presented in the area (427) include references assigned to the advertisers (e.g., advisors, sellers, etc.). The assigned references can be used to request connections with the respective advertisers for real time communications.

In one embodiment, an advertiser is charged an advertisement fee per a connection with a customer established via the advertisement for real time communications. In one embodiment, an advertiser is charged a commission fee when the customer is charged for a transaction over the connection established via the advertisement. In one embodiment, an advertiser is charged an advertisement fee per a presentation of the advertisement. In other embodiments, a combination of fees can be collected for the advertisement, or a subscription can be charged for the advertisement. Alternatively, the advertisements can be presented without a charge.

In one embodiment, an advertisement fee is charged for the advertisement or listing presented in the area (427) or area (423) when the user is connected to the advertiser for real time communication. The advertisement fee may be an amount specified by the advertiser, or by the advertising system. In the embodiment, the advertisement fee is determined based on a bid for maximum price specified by the advertiser and the closest bid of the competitor of the advertiser.

In one embodiment, the operator of the web site (407) is compensated per the connection established via the advertisement.

In one embodiment, when an assigned reference is used to call for connections, the user is connected to a connection server as an end point. The connection server determines the communication reference of the advertiser based on the assigned reference used to connect the user and the connection server and then further connects the user to the advertiser. Through the use of the assigned reference, the connection server is in the path of connecting the user and the advertiser to track the connection made via the advertisement.

For example, the assigned reference may be a telephone number of the connection server, which when called by the user can be used to determine the telephone number of the advertiser; and the telephone number of the advertiser can be used to further connect the call to the advertiser. For example, the assigned reference may be a reference to request a callback to the user to connect to the advertiser. For example, the assigned reference may be an identifier of the advertiser, such as a user ID of the advertiser, a SIP URL of the advertiser, etc. The assigned reference can be passed to the connection server in a call signaling message of a VoIP call, be used to request a server to resolve the reference into a direct reference for use in a network, or be used to report to a server about the call to the advertiser.

In one embodiment, the user terminals designed to make the connections via the advertisement can use the assigned reference to track the connection and report the connection to a server for the connection made via the advertisement. For example, softphones can be designed to make direct connections over a peer to peer network, without going through a centralized connection server. The softphones can be configured to report the calls made via the advertisements to a server for tracking. Alternatively, the softphones may be configured to deduct fees, or transfer funds, via accounts maintained by the softphones, or accounts accessible individually by the softphones.

Although FIG. 12 illustrates various types of information presented in the document, the disclosure is not limited to the specific combination illustrated in FIG. 12. More or less information or different types of information can be presented in the document. In some embodiments, the documents are presented in the web browser; in other embodiments, the documents can be presented via other types of application programs, such as a spreadsheet, a word processor, a document editor, etc. In one embodiment, the document is presented on an apparatus which has the capability to establish the connections for real time communications, such as a softphone, or a cellular phone or a PDA based phone.

Figure 13:
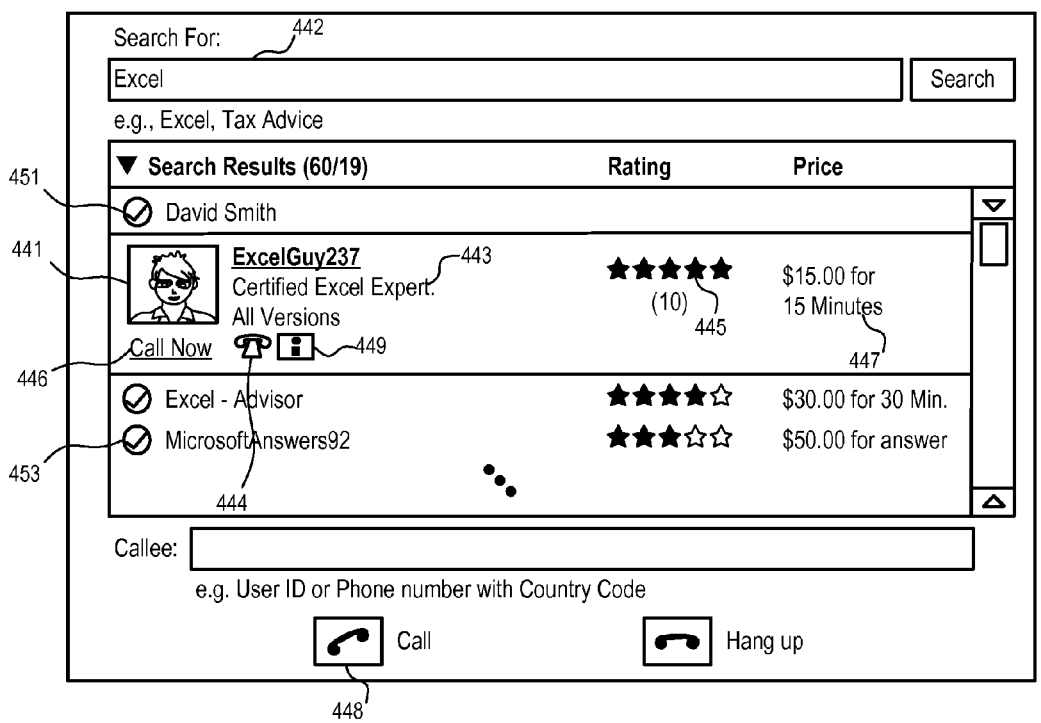
FIG. 13 shows an example of presenting a list of references on a telephonic apparatus according to one embodiment.

FIG. 13 shows an example of presenting a list of references on a telephonic apparatus according to one embodiment. In FIG. 13, the user may enter one or more key words (e.g., "Excel") in the search box (442) under the heading "search for" to indicate the requirement for the search.

FIG. 13 the search result includes one listing (451) from the personal address book of the user, one or more listings (e.g., 441) from a fee-based advisor database, and some listings (e.g., 453) from a business listing database.

In one embodiment, some top positions in the list of search results are reserved for listings retrieved from certain sources (e.g., address book and/or the advertisement database). For example, up to a first number of top positions can be reserved for the listings obtained from the personal address book; and up to a second number of next top positions can be reserved for listings from the advertisement database; and other listings can be mixed in the remaining positions of the list based on a ranking indicator, such as the earning potential for presenting the listings, the degree of matching to the search criteria, availability of the callee to communicate in real time at the time of the presentation of the listings, ratings of the customers, the prices of the sellers, etc.

In another embodiment, the priorities of the different sources are represented by different weights for sorting the results in a unified way. For examples, a ranking indicator may be evaluated based on a function of the earning potential, the degree of matching to the search criteria, and real time availability of the callee, and/or other considerations. To sort the listings from different sources in a unified way, the earning potential, the degree of matching to the search criteria, real time availability of the callee, and/or other considerations can be modified with a weighting factor assigned according to the priority of the source of the listing before being used in the ranking function to compute the ranking indicator.

In another embodiment, the list of search results are limited to a specific source. Alternatively, listings from different sources can be presented in separated areas designated for the different sources.

In one embodiment, when a listing is selected, an expended entry is displayed for the listing. For example, an expanded advisor entry shows a photo image (441) of the advisor, a description (443) of the expertise of the advisor, the rating (445) based on the experience of prior activity of the advisor, the price (447), etc.

In one embodiment, the expanded entry further includes an information icon (449), which can be selected to provide a profile page about the advisor. For example, the profile page may include the expertise of the advisor, the rate, a detailed description, social connections, and/or previous consumer feedback information, such as rating, comments, recommendations, etc.

In FIG. 13, the expanded entry includes a call icon (444) which can be selected to initiate a call to the advisor. Alternatively, the user can call the advisor via selecting the "call now" link (446) of the listing, or selecting the call button (448) while the listing is being selected/highlighted. In FIG. 13, the telephonic reference of the advisor is not displayed in the listing; and the user is encouraged to call via the telephonic apparatus. Alternatively, the telephonic reference of the advisor can also be displayed for the listing; and the user has the option to use a different telephonic apparatus to place the call.

In one embodiment, the appearances of the call buttons or links are rendered based on whether the advisor (seller, or advertiser) is currently scheduled to receive calls. If the call buttons or links are presented during a non-callable time period of the callee, such as when the current time is outside the scheduled hours for receiving calls or when the callee is currently off calls, the appearances of the call buttons or links are rendered to indicate that the callee is not currently available for real time communications; and the call buttons or links cannot be activated to call the callee. When the callee is not currently available for real time communications, the call buttons or links can be activated to schedule an appointment or request a callback.

FIG. 13 illustrates examples of visual interfaces for presenting the listings. Alternatively, the listings can be presented via an audio portal. For example, a user can call a phone number of a connection server for an interactive voice response system (IVR), which receives user specified search criteria and presented the search results obtained from different sources in a combined list.

One embodiment enables a partner to offer communication references for entities (e.g., in online marketplace, voice portal, advertisement placement, etc.) such that real-time communication connections to the entities can be established when the communication references are used to request for the communication connections.

For example, a marketer may operate a web site to promote sellers (e.g., advisors, advertisers), an online marketplace, and/or a voice portal. The marketer has the contact information of the sellers, such as phone numbers. The marketer may not have the facilities to track the phone calls to the phone numbers of the sellers. As a partner of a connection provider, the marketer may provide the contact information of the sellers to the connection provider and obtain links and/or custom 800 numbers that can be used by the customers of the marketer to at least initiate the real-time communication connections to the sellers. For example, when a customer of the marketer selects the link, or dials the 800 number, that is assigned for a seller of the marketer, the connection provider makes an arrangement to connect the customer to the corresponding seller using the contact information of the seller. Thus, the marketer does not have to maintain separate facilities to track the phone calls and make the phone connections; and the connection provider can provide the service to different marketers.

Further, in one embodiment, responsive to the establishment of the connection between the customer and the seller, the connection provider may further charge the customer a fee on behalf of the seller for purchasing from the seller (e.g., purchasing a period of real-time communication with the seller and/or products/services offered over the communication connection) and/or charge the seller on behalf of the marketer a fee for the advertisement presented by the marketer. The connection provider may further distribute the charged fee to the marketer and/or to the seller directly or indirectly via the marketer. Thus, the marketer may delegate a payment processing task associated with tracking and providing communication connections to the connection provider. Alternatively, the marketer may perform the payment processing tasks based on the information about the communication connections tracked and provided by the connection provider.

In one embodiment, a connection provider may enable a marketer to focus on the aspect of matching customers and sellers and delegate to the connection provider the tasks of providing communication connections, tracking the communication connections, collecting fees, and/or distributing payments.

In one embodiment, a marketer may use the services of a connection provider to operate an online marketplace and voice portal. The services of the connection provider may be behind the scene and/or customized for the marketer such that the customers of the marketer may not be aware of that part of the services is from the connection provider which may be an entity different from the marketer.

Figure 14:
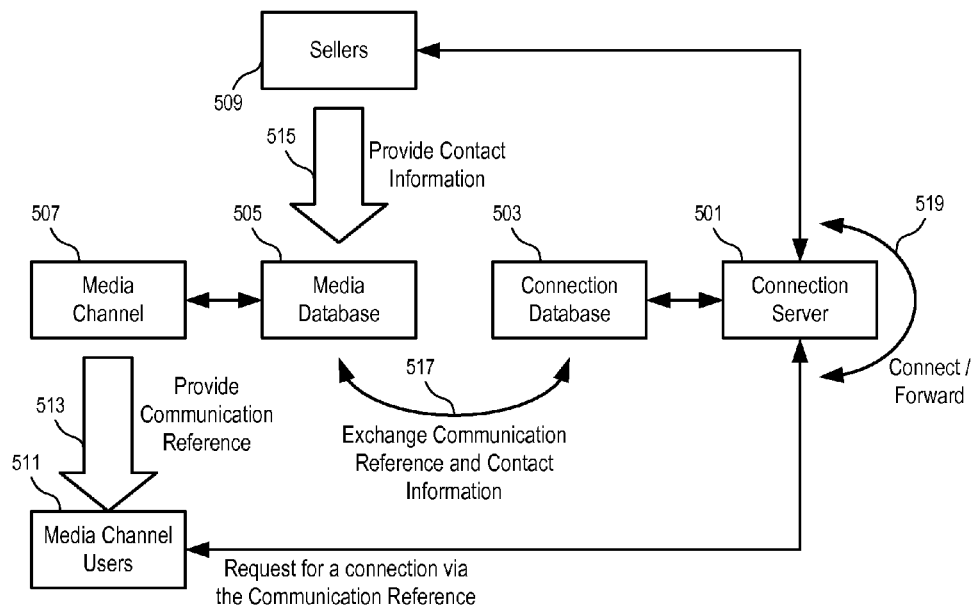
FIG. 14 illustrates a system to provide communication connections according to one embodiment.

FIG. 14 illustrates a system to provide communication connections according to one embodiment. In FIG. 14, sellers (509) provide (515) their contact information to the media database (505). The media database (505) may also include other information that is used by the media channel (507) to present the sellers (509) to the medial channel users (511).

In FIG. 14, the contact information of the sellers is not provided to the media channel users (511). Instead, a communication reference can be assigned to the contact information of a seller and provided (513) to the media channel user (511) via the media channel (507). The media database (505) and the connection database (503) exchange (517) communication reference and contact information of the sellers. The connection server (501) is used to connect the sellers and the media channel users (511). Using the communication reference, a media channel user may request for a connection with the corresponding seller. The connection server (501) determines the contact information based on the communication reference used to make the request.

For example, using the contact information looked up according to the communication reference, the connection server (501) makes a connection with the seller and then connects the media channel user and the seller (e.g., through forwarding communications across the connection server).

In one embodiment, the media channel (507) and the media database (505) may be operated by a marketer; and the connection database and the connection server (501) may be operated by a connection provider. The marketer and the connection provider may communicate with each other electronically to exchange (517) the communication reference and contact information.

The communication reference may be a representation of a user interface element, such as a link, an icon, a button (e.g., in HTML or a script), which can be rendered in a browser and selected to send the request to the connection server. The communication reference may include an identifier to represent a seller or a record of the contact information of the seller. For example, the identifier may be a seller identifier that can be used to look up the seller and then determine a phone number of the seller from information about the seller. For example, the identifier may be a record identifier that points to a record in the connection database (503); and the record includes a phone number of the seller. For example, the communication reference may be a click to call button assigned to the seller.

The communication reference may be a phone number of the connection server (501). The phone number may or may not include an extension that is to be dialed after the connection server (501) picks up the call from the medial channel user. The phone number can be used as a seller identifier or a record identifier to look up the phone number of the corresponding seller. The phone number may be a toll free number (e.g., an 800 number) or a phone number local to a geographic area (e.g., an area in which the media channel users are located).

In one embodiment, the media database (505) can provide the contact information of the seller (e.g., the phone number of the seller) to the connection database (503) and update the contact information of the seller according to the input for the seller. Thus, a copy of the contact information of the seller is stored/cached in the connection database (503). The connection provider may alternatively request the contact information corresponding to a communication reference from the media database in real time and/or cache the information (e.g., for a session, for a predetermined period of time).

In one embodiment, the connection database (503) can provide the media database the communication reference for a specific seller (or a specific contact information entry of the seller). The media database (505) may request the communication reference at a setup time for the seller so that the entry of the seller is properly set up and the media channel may use the entry to present the seller (e.g., in response to a search request, in response to a request to show the listing of a specific category, in response to a placement of an advertisement in a web page, etc.) The media database (505) may alternatively request the communication reference on demand (e.g., when the media channel receives a request for a display of the seller).

In one embodiment, a connection server may provide connection services for multiple marketers who operate different media channels (e.g., web pages, newspapers, magazines, television broadcasting systems, bill boards, etc.). A communication reference may further include an identifier that can be used to identify the corresponding marketer. Thus, the connection server may use the identifier to contact the marketer for information about the seller (e.g., availability status, contact information) and/or provide credit/compensation to the marketer.

In one embodiment, a button representation of the communication reference may show the current status of the seller to engage in real time communication with the media channel user. At the time the button is rendered in the web browser, the web browser further downloads information about the current status of the seller to determine the appearance of the button. Thus, before the button is selected by the user, the user may see an indication of availability of the seller to accept the call. Since the status information is downloaded at the time of the rendering of the button, the current status of the seller is displayed. Further, the button may be configured to periodically check for updated status information.

The media channel and the media database may obtain the current status information about the seller at the time the representation of the button is downloaded. The status information at the time of downloading the web page may be hardwired within the representation of the button.

Alternatively, the marketer may redirect the communication related to the status of the seller to the connection providers such that the current status information is maintained in the connection database (503).

The connection provider may further provide the status information after the communication reference is used to request for a communication connection to the seller. For example, a call graphic may be presented to guide the media channel user through the connection operations; and the call graphic may include the current status information about the seller. For example, when the media channel user uses the phone number of the connection server to request the connection, the connection server may use an IVR system to tell the media channel user about the current status of the seller.

In one embodiment, the connection database (505) obtains the status information from the sellers (509). For example, when the sellers (509) visit a web page of the marketer, the web page redirects the sellers (509) to a server of the connection provider, which allows the sellers to specify the scheduled times for receiving communications and/or current changes to the availability statuses. The redirected web page may be displayed in a popup window so that the sellers do not have to leave the context of the web page provided by the marketer. For example, when a seller clicks on a link or icon to specify a change to the current availability status on an account management page provided by the marketer, the browser of the seller may bring up a popup window and direct the request to the web site of the marketer, which sends a redirect message to redirect the request to a web site of the connection provider, which then provides a web page for display in the popup window to collect the information related to availability, including work hours, etc. Thus, the status information is collected by the web site of the connection provider in the context of a web page of the marketer. The connection database may obtain the status information through communication with the media database (505).

The price information may be specified in a web site of the connection provider or a web site of the marketer. For example, the marketer may redirect the task of managing price bidding to the connection provider. The connection provider may show the price information of competitors of the seller and receive a price bid from the seller. The price bid is stored in the connection database and/or provided to the marketer through a communication channel between the connection provider and the marketer.

Alternatively, for example, the marketer may manage the price bidding and stored the price information in the media database (e.g., for storing and selecting the sellers for display to the medial channel users). The price information may be forwarded to the connection database (503). The connection server may use the price information to ask the user to confirm the purchase of a period of time of real time communication with a seller who provides information, entertainment, advice over the communication connection (e.g., before the user is connected to the seller), or charge the user and/or the seller according to the price information (e.g., for the purchase of advice, or for the advertisement for the seller).

For example, the marketer may redirect the management of call packages to the connection provider, or provide custom web pages to manage the call packages and communicate the call package information to the connection database (503).

The connection server may manage an aspect of payment process for the marketer. For example, the connection server may collect fees from the media channel users based on the call packages purchased by the users (e.g., charging a credit account, a bank account or an online payment account) and/or distribute compensations to the sellers for the call packages sold to the users. The connection server may further manage accounts of the sellers and the users for the purposes of conducting financial transactions on behalf of the marketer. Thus, the marketer may be freed from the burden of managing some of the financial transactions.

Alternatively, for example, the marketer may process the financial transactions with the users and sellers, after the connection server reports the information about the communication connections to the marketer, such as the date and time of the connection and the duration, etc. The connection server can use the communication references to identify the sellers in collecting the information related to the communication connections.

The connection server may communicate with the marketer to authenticate the media channel user. For example, the connection server may verify with the marketer that the media channel user is a registered user of the marketer so that the user may be charged accordingly.

In one embodiment, the connection server may collect the credit card account information (or bank account information, or other types of accounts) and forward the account information to the marketer so that the marketer may charge the user. Alternatively, the connection server may charge the user on behalf of the marketer.

In some types of services, the media channel users (511) may or may not be charged for the communication. For example, the sellers may use the media channel to present advertisements to the media channel users; the sellers may be charged for the advertisement (e.g., in response to the connection); and the media channel users are not charged. Further, for example, the sellers may reward the channel users (511) for having a phone connection with them to listen to their advertisement information. In another embodiment, for example, the sellers may charge the media channel users for a period of communication over the connection to receive information, entertainment, advice, etc. Thus, it may or may not necessary to identify the media channel users and determine their account information. The communication reference may include an indication of the type of information to be collected by the connection server.

From the above discussion, one understands that the marketer may delegate more or less of the tasks related to the establishment of the connection and payment processing to the connection provider.

Figure 15:
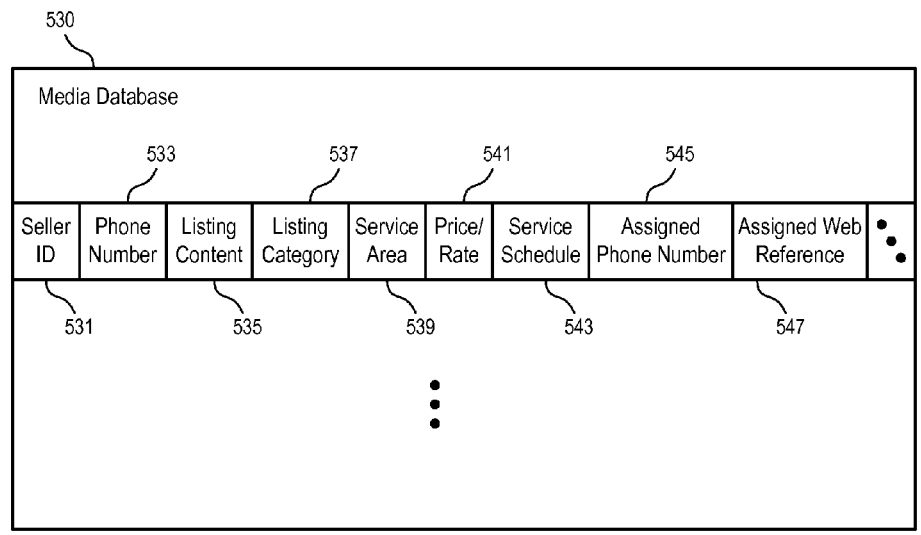
FIGS. 15-16 illustrate a media database and a connection database which can be used in a system to provide communication connections according to one embodiment.
Figure 16:
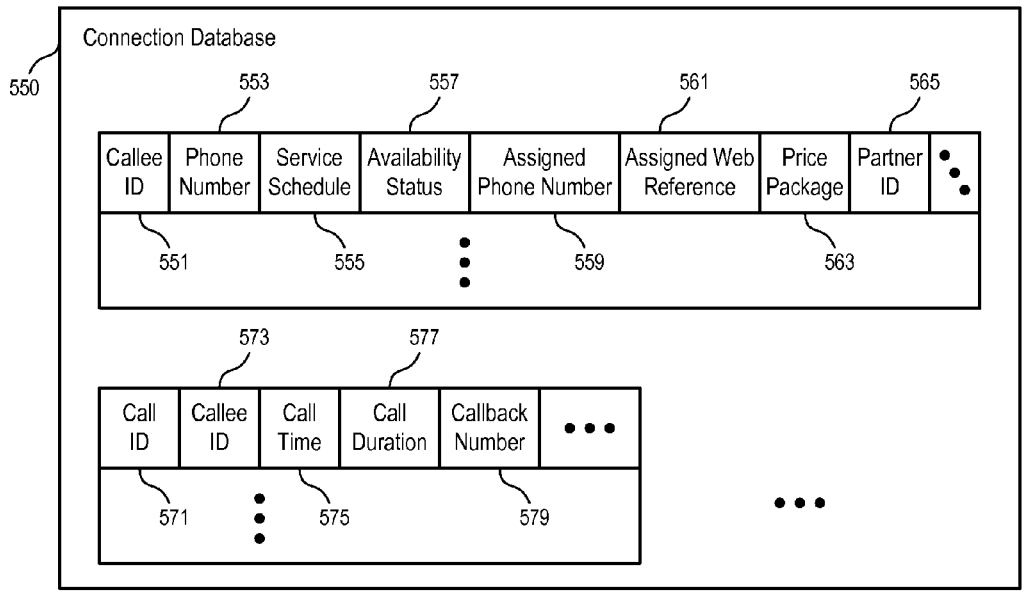

FIGS. 15-16 illustrate a media database and a connection database which can be used in a system to provide communication connections according to one embodiment.

In FIG. 15, a media database (530) may include a field "Seller ID" (531) to represent a seller. For the seller, the media database (530) may include a field to store the phone number (533) of the seller. The phone number of the seller is typically associated with a telephone set of the seller through a telephone carrier. The phone number of the seller is typically not presented to the media channel users. Instead, an assigned phone number (545) is presented for the seller to the media channel users. The assigned phone number (545) may be associated with a telephone equipment of the connection provider through a telephone carrier. When the assigned phone number (545) is dialed, the telephone carrier connects the call to the telephone equipment of the connection provider, which can determine the phone number (533) of the seller based on the dialed assigned phone number (545) and further connect (forward) the call to the seller.

In one embodiment, the media database (530) obtains the assigned phone number (545) and assigned web reference (547) (e.g., a link or a representation of a button) from the connection provider for the seller.

The media database may further include the listing content (535), listing category (537), service area (539), etc. about the seller. This information can be used by the marketer to generate a listing for presentation on behalf of the seller.

The media database may optionally include the price/rate (541) for communications with seller, and/or for advertisement presented on behalf of the seller. The marketer may use the price/rate (541) to selectively present sellers and to determine placement priorities for the sellers.

The media database may optionally include the service schedule (543), such as the work hours during the day and the week. Using the service schedule (543), the time period in which the seller is not available to receive a phone call may be determined. The media database may communicate the service schedule (543) to the connection provider such that the availability status information can be determined at least partially from the service schedule (543); and calls may be scheduled at least partially according to the service schedule (543).

Optionally, some of the data fields may be maintained in a connection database of a connection provider. When needed, the data can be fetched from the connection database of the connection provider through a communication channel between the connection provider and the marketer.

In FIG. 16, the connection database (550) may include a callee ID (551) to represent a callee (e.g., seller). The phone number (553) of the callee may be stored in the connection database (550) in association the assigned phone number (559) and the assigned web reference (561) so that when a request for a connection is received via the assigned phone number (559), or the assigned web reference (561), the phone number of the callee can be determined and used to complete the connection. Alternatively, the phone number (553) may be retrieved from the marketer (e.g., from the media database) when the request for connection is received via the assigned phone number (559) or the assigned web reference (561).

The connection database (550) may further include the service schedule (555), such as the work hours during the day and the week, and the availability status (557) which may be changed in real time based on the information received from the callee. For example, the callee may use a communication channel (e.g., a web page) to specify the current availability status. Further, when the connection server establishes a separate phone connection with the callee, the callee may indicate the availability status to the IVR system of the connection provider.

The connection database (550) may further include the price package (563) which may be specified by the callee (551). The connection provider may use the price package information to make charges on behalf of the marketer (or the callee).

The callee ID may also be associated with a partner ID (565) which may represent the marketer. Thus, the connection provider may report the data related to connections to the corresponding marketer and/or compensate the corresponding marketer.

The connection database (550) may include entries to record the connection activities. For example, a call ID (571) may be used to represent a phone call. Callee ID (573) indicates the seller that is being called in the phone call. Call time (575) indicates the date and time of the call. Call duration (577) indicates the time period of the phone connection between the seller and the caller. Callback number (579) shows the callback number of the caller. Optionally, an entry for a connection may further include other information, such as the identity of the caller, credit card number of the caller, a callback time window specified by the caller, etc.

Figure 17:
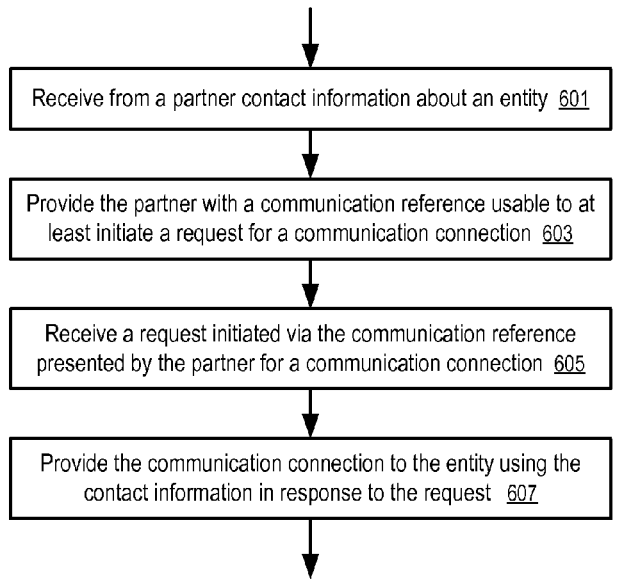
FIGS. 17-18 show flow diagrams of methods to provide communication connections according to some embodiments.
Figure 18:
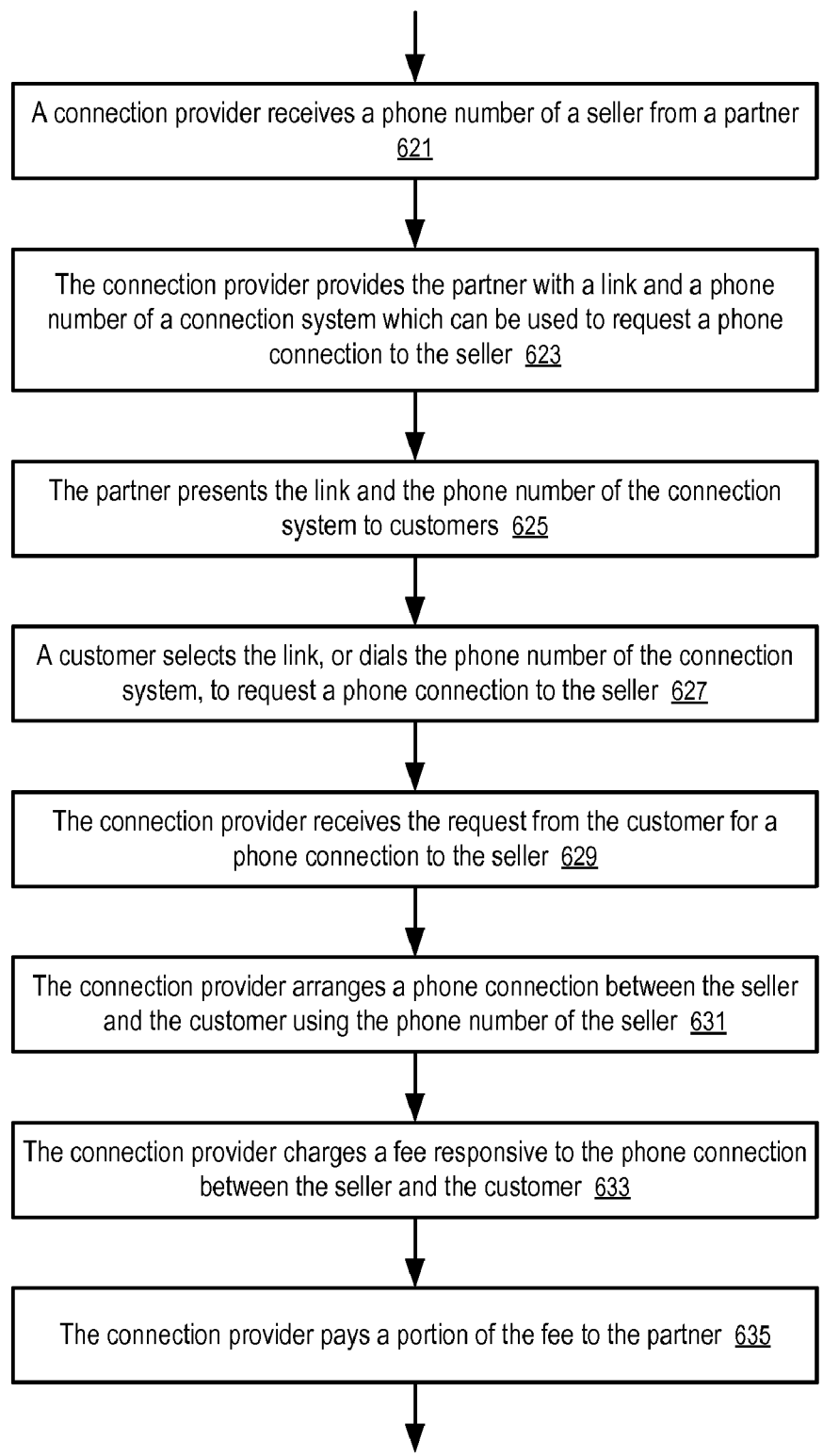

FIGS. 17-18 show flow diagrams of methods to provide communication connections according to embodiments.

In FIG. 17, contact information about an entity is received (601) from a partner; and a communication reference usable to at least initiate a request for a communication connection is provided (603) to the partner. In response to that a request initiated via the communication reference presented by the partner is received (605) for a communication connection, the communication connection to the entity is provided (607) using the contact information.

In FIG. 18, a connection provider receives (621) a phone number of a seller from a partner and provides (623) the partner with a link and a phone number of a connection system which can be used to request a phone connection to the seller. The partner presents (625) the link and the phone number of the connection system to customers. Once a customer selects the link, or dials the phone number of the connection system, to request a phone connection to the seller (627), the connection provider receives (629) the request from the customer for a phone connection to the seller and arranges (631) a phone connection between the seller and the customer using the phone number of the seller.

The connection provider may charge (633) a fee responsive to the phone connection between the seller and the customer and pay (635) a portion of the fee to the partner. The customer may be charged for purchasing a period of phone communication with the seller; and within a period of time a customer may be reconnected to the seller with a further fee before the purchased period of phone communication elapses or expires. Alternatively, the seller may be charged for an advertisement presented by the partner on a per call basis, excluding repeated calls from the same customer made within a period of time. The phone connection may be partially carried via a VoIP system.

One embodiment includes a platform provided to allow a partner to present the listings of a set of sellers under their own label while allowing a connection provider to make the connection, tracking the calls and billing the customers and/or the advertisers on behalf of the sellers. In one embodiment, an interface is provided to allow the partner to use the connection provider to perform the tasks while the user experiences are customized according to one or more attributes of the partner.

In one embodiment, the content and description of an advertisement is maintained by the partner; and in response to a request from the partner to facilitate tracking of the communication to an advertiser, the connection provider dynamically provides the communication reference to the partner for presentation in the advertisement in a way specific to the partner. When the customer uses the communication reference to request a connection to the advertiser, the connection provider connects the customer to the advertiser and reports the connection to the partner for billing the advertiser for the advertisement.

For example, the partner can provide the telephone number of the advertiser to the connection provider and receive from the connection provider an assigned telephone reference that is associated with the telephone number. The assigned telephone reference may be associated with the telephone number of the advertiser in a database, or may include an encoded/encrypted version of the telephone number of the advertiser.

In one embodiment, the connection provider further obtains payment information of the advertiser from the partner and charges the advertisement fee on behalf of the advertiser in response to the customer making a call to the advertiser for real time communications in person.

In one embodiment, the platform also maintains the advertisements on behalf of the partner. For example, the partner can use the user interfaces provided by the platform to sign on advertisers, to allow the advertisers to create and manage the advertisements, as if the platform were part of the system of the partner.

Figures 19, 20:
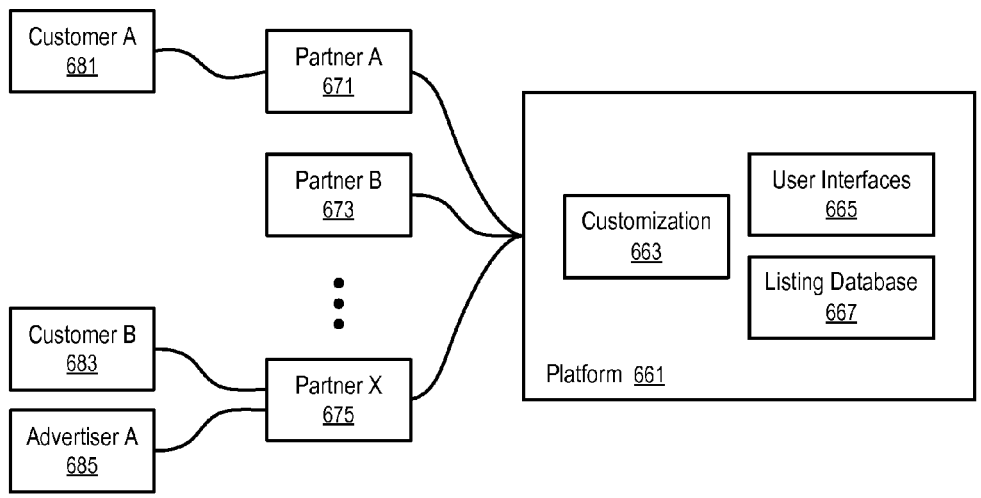
FIG. 19 illustrates a user interface labeled according to one embodiment.
FIG. 20 illustrates an advertisement system with a customizable platform according to one embodiment.

In one embodiment, the user interfaces provided by the platform for a partner is custom labeled for the partner. FIG. 19 illustrates a user interface labeled according to one embodiment. In FIG. 19, a representation (651) of the partner is presented with a representation (653) of the connection provider to label the interface (655) for creating a listing. Alternatively, the representation (651) of the partner is presented without showing a representation (653) of the connection provider to label the interface (655).

FIG. 20 illustrates an advertisement system with a customizable platform according to one embodiment. In one embodiment, the platform (661) can service multiple partners (e.g., 671, 673, . . . , 675) by customizing the user interfaces (665) using a customization module. For example, when the advertiser A (685) accesses the platform (661) through the partner X (675), a version of some of the user interfaces (665) labeled to identify the partner X (675) can be provided for creating or managing accounts and listings which can be stored in the listing database (667) of the platform (663). For example, when the customer B (683) accesses the platform (661) through the partner X (675), a version of some of the user interfaces (665) labeled to identify the partner X (675) can be provided for requesting communication links, for creating or managing accounts, and/or for guidance through the connection process.

In one embodiment, a set of user interfaces are provided as a platform for creating and/or managing accounts of the advertisers and for creating and/or managing the listings of the advertisers. The set of user interfaces can be automatically labeled according to a preference setting of the partner. For example, the partner can provide an icon image representative of the partner; and the user interfaces generated by the platform can automatically include the icon image. Alternatively, the partner can provide a link to an icon image representative of the partner; and the user interfaces generated by the platform can use the link to include icon image. In some embodiments, the user interface can also be labeled via text, auto clips, video clips, animations, and/or banners that are implemented via scripts, applets, etc. For example, a voice portal can be used to manage accounts of advertisers and their advertisements; and an auto clip can be used in a voice prompt to label the voice interface according to a preference of the partner.

In one embodiment, a flow of interfaces for creating a listing is brand labeled according to a preference of the partner. The interfaces are consistently labeled according to one preference setting of the partner. Thus, the partner does not have to individually manage multiple interfaces.

In one embodiment, a set of interfaces offered by the platform can be consistently labeled according to one or more centralized preference settings. The set of interfaces can include interfaces for creating and managing seller accounts, listings, interfaces for graphically illustrating the progress of a call and providing guide in the call progress, interfaces for managing callable schedules, for placing price bids, for specifying callback references, for specifying callback time window, for managing caller queues, for appointments, etc. In one embodiment, the set of interfaces includes voice prompts for audio based interfaces, etc.

Alternatively, the platform can provide the set of interfaces as embeddable components. The partner can embed the interfaces in the environment of the partner and thus customize the labeling of the interfaces. For example, the interfaces offered by the platform can be provided as an embeddable applet within a web page of the partner.

Alternatively or in combination, the platform can allow the partner to individually customize the interfaces.

In one embodiment, an advertiser can be co-registered with both the partner and the provider of the platform such that the advertiser can use the same set of credential for authentication with the partner and for authentication with the platform. Alternatively, the platform may rely on the partner to authenticate the advertiser; and once the advertiser is authenticated by the partner, and the platform can allow the advertiser to access the advertisement accounts maintained by the platform. In some embodiments, the partner may rely on the platform to authenticate the advertiser for services provided by the partner.

In one embodiment, the advertisement is maintained on the database of the platform, which can service multiple partners. The platform can be configured to identify duplicate entries. For example, based on the identification information of the advertiser, such as telephone number of the advertiser, the business name of the advertiser, etc., the accounts created by the same advertiser via different partners can be identified and linked. Once authenticated, the advertiser can have access to various listings of the advertiser, without creating duplicate listings.

Thus, the advertiser has control over the description/content of the advertisement; and the platform provides an easy, intuitive interface for advertisers to initiate services.

In one embodiment, a partner may rely on the platform to get the listings for presentation to customers. For example, one partner may retrieve the listings supplied by the platform or other partners for presentation to customers of the partner. The customer experiences with the partner can be customized according to one or more preference settings of the partner. For example, the voice prompt to the customer and/or the advertiser can be labeled according to a preference of the partner. For example, the graphical user interfaces for graphically illustrating the progress of a call and providing guide in the call progress, for specifying callback references, for specifying callback time window, for requesting appointments, etc. can be labeled according to the preference of the partner.

In one embodiment, the user interfaces for the customers can be labeled according to the partner who contributed to the presentation of the listing and according to the partner who contributed to the generation of the listing. In one embodiment, the user interfaces are further labeled to identify the platform.

Figure 21:
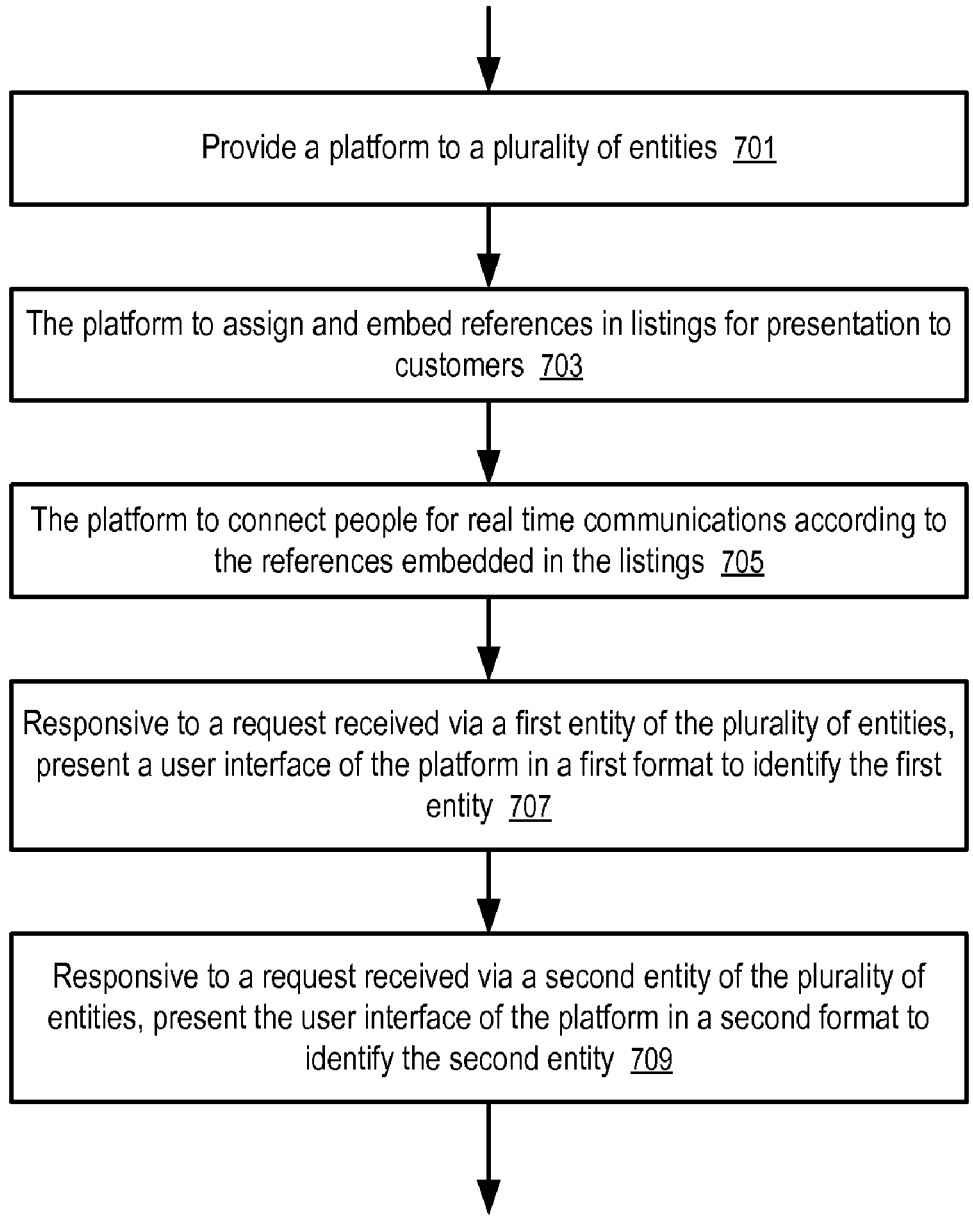
FIG. 21 shows a method to provide a platform to connect people for real time communications according to one embodiment.

FIG. 21 shows a method to provide a platform to connect people for real time communications according to one embodiment. In FIG. 21, a platform is provided (701) to a plurality of entities (e.g. partners). The platform is configured to assign and embed (703) references in listings for presentation to customers and configured to connect (705) people for real time communications according to the references embedded in the listings. The references can be used to request the platform to provide the connections.

In one embodiment, responsive to a request received via a first entity of the plurality of entities, a user interface of the platform is presented (707) in a first format to identify the first entity; and responsive to a request received via a second entity of the plurality of entities, the user interface of the platform is presented (709) in a second format to identify the second entity.

In one embodiment, a plurality of user interfaces of the platform configured to register a user, to create a listing, to manage the listing, to show a progress of a connection process initiated via a presentation of the listing, and to guide through the connection process are customized for presentation according to an entity through which the platform is accessed. In one embodiment, the plurality of user interfaces are automatically customized according to one preference setting of the entity through which the platform is accessed.

In one embodiment, the user interface is presented to further identify the platform in both the first format and in the second format. In one embodiment, the first entity, the second entity or the platform is identified in the first format via text, an icon image, an audio clip, a video clip, an animation, or an applet.

In one embodiment, the platform provides the user interface for embedding in an interface of the first entity to serve requests received via the first entity and for embedding in an interface of the second entity to serve requests received via the second entity.

In one embodiment, the user interface may be used to register an advertiser of a listing, to create the listing, to manage the listing, to show a progress of a connection to the advertiser, to register a customer, or to guide a customer of the advertiser through the connection to the advertiser.

In one embodiment, the advertiser is charged an advertisement fee per the connection to the advertiser. For example, the platform can assign and embed a telephonic reference in the listing of the advertiser for the presentation of the listing to the customer, such as a telephone number of the platform without an extension, a telephone number of the platform with an extension, a session initiation protocol (SIP) uniform resource identifier (URI), a user identifier of an instant messaging network, or a Voice over Internet Protocol (VoIP) user identifier. Responsive to a request made via the telephonic reference embedded in the listing, the platform can establish a first connection to the customer and a second connection to the advertiser and bridge the first and second connections to connect the customer and the advertiser. In one embodiment, bridging the first and second connections includes establishing a media connection over a data communication network to connect the customer and the advertiser, in which the media connection does not go through the platform.

In one embodiment, the connection to the advertiser is a peer to peer connection between a user terminal of the customer and a user terminal of the advertiser.

In one embodiment, the platform can charge the customer on behalf of the advertiser in response to the customer accepting a payment request from the advertiser. In one embodiment, the platform can charge the advertiser on behalf of the customer in response to the advertiser purchasing a product or service from the customer.

In one embodiment, when the listing is created via the first entity and the presented via the second entity, a user interface to the customer is presented to identify both the first entity and the second entity.

In one embodiment, when the listing is created via the first entity, the platform can request the first entity to authenticate the advertiser for accessing user interfaces to manage the listing.

In one embodiment, the platform can identify a duplicate registration of the advertiser, or a duplicate listing of the advertiser.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A method, comprising:
providing, via a telecommunication connection provider server, to a plurality of demand partners, each acting as a demand partner for a respective set of advertisers for the presentation of a respective advertisement for a respective advertiser, a platform configured to assign a respective reference embedded in a respective listing of the respective advertiser, for presentation and configured to connect a customer for a real time communication utilizing the respective reference embedded in the respective listing, the reference used to request the platform to provide the connection;
responsive to a request received from a first demand partner from amongst the plurality of demand partners, presenting a user interface of the platform for creation of an advertisement for an advertiser, having the first demand partner as a demand partner, in a first format specific to the first demand partner and having a first type of tracking mechanism specific to the first demand partner and selected at least in part based on a success rate for the first demand partner; and
responsive to a request received from a second demand partner from amongst the plurality of demand partners, presenting a user interface of the platform for creation of an advertisement for an advertiser, having the second demand partner as a demand partner, in a second format specific to the second demand partner and having a second type of tracking mechanism specific to the second demand partner and selected at least in part based on a success rate for the second demand partner.

2. The method of claim 1, wherein the user interface presented in the first format and the user interface presented in the second format are each presented to further identify the platform.

3. The method of claim 1, wherein the first entity is identified in the first format using one of text, an icon image, an audio clip, a video clip, an animation, and an applet.

4. The method of claim 1, wherein the plurality of user interfaces are configured to one of register a user, create a listing, manage the listing, show a progress of a connection process initiated using a presentation of the listing, and guide the user through the connection process, and wherein the plurality of user interfaces are customized for presentation according to the entity through which the platform is accessed.

5. The method of claim 4, wherein the plurality of user interfaces are customized according to one preference setting of the demand partner through which the platform is accessed.

6. The method of claim 1, wherein the user interface is configured to one of register an advertiser of a listing, create the listing, manage the listing, show a progress of a connection to the advertiser, register a customer, and guide a customer of the advertiser through the connection to the advertiser.

7. The method of claim 6, wherein the advertiser is charged an advertisement fee for the connection to the advertiser.

8. The method of claim 7, further comprising:
assigning, via the platform, a telephonic reference and embedding the telephonic reference in the listing of the advertiser for presentation of the listing to the customer; and
responsive to a request made using the telephonic reference embedded in the listing, establishing a first connection to the customer and a second connection to the advertiser and bridging the first connection and the second connection to connect the customer and the advertiser.

9. The method of claim 8, wherein the bridging the first connection and the second connection comprises establishing a media connection over a data communication network to connect the customer and the advertiser; and wherein the media connection does not go through the platform.

10. The method of claim 8, wherein the telephonic reference assigned for embedding in the listing of the advertiser comprises one of a telephone number of the platform without an extension, a telephone number of the platform with an extension, a session initiation protocol uniform resource identifier, a user identifier of an instant messaging network, and a voice over Internet protocol user identifier.

11. The method of claim 7, wherein the connection to the advertiser comprises a peer to peer connection between a user terminal of the customer and a user terminal of the advertiser.

12. The method of claim 6, further comprising:
the platform charging the customer on behalf of the advertiser in response to the customer accepting a payment request from the advertiser.

13. The method of claim 6, further comprising:
the platform charging the customer on behalf of the advertiser in response to the customer purchasing one of a product and a service from the advertiser.

14. The method of claim 6, wherein when the listing is created using the first entity and then presented using the second entity, a user interface to the customer is presented identifying both the first entity and the second entity.

15. The method of claim 6, wherein when the listing is created using the first entity, the method further comprises:
requesting, via the platform, the first entity to authenticate the advertiser to be able to access user interfaces to manage the listing.

16. The method of claim 6, further comprising:
identifying, via the platform, a duplicate registration of the advertiser.

17. The method of claim 6, further comprising:
identifying, via the platform, a duplicate listing of the advertiser.

18. The method of claim 1, further comprising providing, via the platform, the user interface for embedding in an interface of the first demand partner to serve requests received from the first demand partner and for embedding in an interface of the second demand partner to serve requests received from the second demand partner.

19. A tangible machine-readable media storing non-transitory instructions that, when executed by a computing device, cause the computing device to perform a method, the method comprising:

providing to a plurality of demand partners, each acting as a demand partner for a respective set of advertisers for the presentation of a respective advertisement for a respective advertiser, a platform configured to assign a respective reference embedded in a respective listing of the respective advertiser, for presentation and configured to connect a customer for a real time communication utilizing the respective reference embedded in the respective listing, the reference used to request the platform to provide the connection;

responsive to a request received from a first demand partner from amongst the plurality of demand partners, presenting a user interface of the platform for creation of an advertisement for an advertiser, having the first demand partner as a demand partner, in a first format specific to the first demand partner and having a first type of tracking mechanism specific to the first demand partner and selected at least in part based on a success rate for the first demand partner; and responsive to a request received from a second demand partner from amongst the plurality of demand partners, presenting a user interface of the platform for creation of an advertisement for an advertiser, having the second demand partner as a demand partner, in a second format specific to the second demand partner and having a second type of tracking mechanism specific to the second demand partner and selected at least in part based on a success rate for the second demand partner.

20. A system, comprising:
a computing device configured to:

provide to a plurality of demand partners, each acting as a demand partner for a respective set of advertisers for the presentation of a respective advertisement for a respective advertiser, a platform configured to assign a respective reference embedded in a respective listing of the respective advertiser, for presentation;

connect a customer for a real time communication utilizing the respective reference embedded in the respective listing, the reference used to request the platform to provide the connection;

present, responsive to a request received from a first demand partner from amongst the plurality of demand partners, a user interface of the platform for creation of an advertisement for an advertiser, presented by the first demand partner, in a first format specific to the first demand partner and having a first type of tracking mechanism specific to the first demand partner and selected at least in part based on a success rate for the first demand partner; and present, responsive to a request received from a second demand partner from amongst the plurality of demand partners, a user interface of the platform for creation of an advertisement for an advertiser, presented by the second demand partner, in a second format specific to the second demand partner and having a second type of tracking mechanism specific to the second demand partner and selected at least in part based on a success rate for the second demand partner.

* * * * *